United States Patent
King et al.

(10) Patent No.: US 10,485,242 B2
(45) Date of Patent: *Nov. 26, 2019

(54) SENSOR-GUIDED AUTOMATED METHOD AND SYSTEM FOR PROCESSING CRUSTACEANS

(71) Applicant: Canadian Centre For Fisheries Innovation (CCFI), Saint John's (CA)

(72) Inventors: Stephen King, Paradise (CA); Paul Hearn, Saint John's (CA)

(73) Assignee: Canadian Centre For Fisheries Innovation (CCFI), Saint John's (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,488

(22) Filed: Feb. 12, 2019

(65) Prior Publication Data

US 2019/0166856 A1 Jun. 6, 2019

Related U.S. Application Data

(63) Continuation of application No. 15/762,783, filed as application No. PCT/CA2016/000238 on Sep. 20, 2016, now Pat. No. 10,264,799.

(30) Foreign Application Priority Data

Sep. 24, 2015 (CA) ..................................... 2904958

(51) Int. Cl.
*A22C 17/00* (2006.01)
*A22C 17/02* (2006.01)
*A22C 29/02* (2006.01)

(52) U.S. Cl.
CPC .......... *A22C 17/0086* (2013.01); *A22C 17/02* (2013.01); *A22C 29/02* (2013.01); *A22C 29/023* (2013.01)

(58) Field of Classification Search
CPC ............................... A22C 17/00; A22C 17/06
(Continued)

(56) References Cited

U.S. PATENT DOCUMENTS 3,596,310 A 8/1971 Tolley
3,611,478 A 10/1971 Lockerby
(Continued)

FOREIGN PATENT DOCUMENTS

CA 2898895 A1 8/2014

OTHER PUBLICATIONS

Canadian Patent Office, Search Report and Written Opinion in International Patent Application No. PCT/CA2016/000238, dated Oct. 17, 2016; 7 pages.

*Primary Examiner* — Richard T Price, Jr.
(74) *Attorney, Agent, or Firm* — Wood Herron & Evans LLP

(57) ABSTRACT

The invention provides a sensor-guided, automated system that is capable of intelligently cutting crustaceans, such as crab and lobster, into a plurality of portions, as directed. More particularly, the present system is capable of effectively butchering each individual crustacean in response to how the system's sensor(s) assess the physical characteristics of each crustacean as it arrives via a conveyor belt. The system generally comprises: an intake apparatus for receiving a crustacean; a sensor-guided positioning ("SGP") system for determining the presence, location, orientation and size of the crustacean on the intake apparatus, coupling the crustacean, and placing the crustacean into a holding system for butchering; a holding system for retaining the crustacean in an optimal fixed position for butchering; a sensor-guided butchering ("SGB") system for determining the locations on a crustacean body to be cut based on the desired output of crustacean portions, and cutting the crustacean at the chosen (Continued)

locations to produce optimal crustacean products; and an outlet apparatus which discharges the butchered crustacean from the system for subsequent packaging.

27 Claims, 20 Drawing Sheets

(58) Field of Classification Search
USPC .......................................................... 452/1, 12
See application file for complete search history.

(56) References Cited

U.S. PATENT DOCUMENTS

| | | | |
|---|---|---|---|
| 4,073,041 A | | 2/1978 | Davis et al. |
| 4,286,356 A | | 9/1981 | Wenstrom |
| 4,293,981 A | | 10/1981 | Smith |
| 4,380,094 A | | 4/1983 | Tolley et al. |
| 4,535,507 A | * | 8/1985 | Reinke ................. A22C 29/025 452/1 |
| 4,715,093 A | | 12/1987 | Lapeyre et al. |
| 4,748,724 A | | 6/1988 | Lapeyre et al. |
| 5,401,207 A | | 3/1995 | Hicks et al. |
| 5,836,266 A | * | 11/1998 | Watanabe ............... A01K 61/54 119/234 |
| 6,193,596 B1 | * | 2/2001 | Adcock ................... A22C 29/04 452/12 |
| 7,674,159 B1 | * | 3/2010 | Littledeer ............ A47G 21/063 452/13 |

* cited by examiner

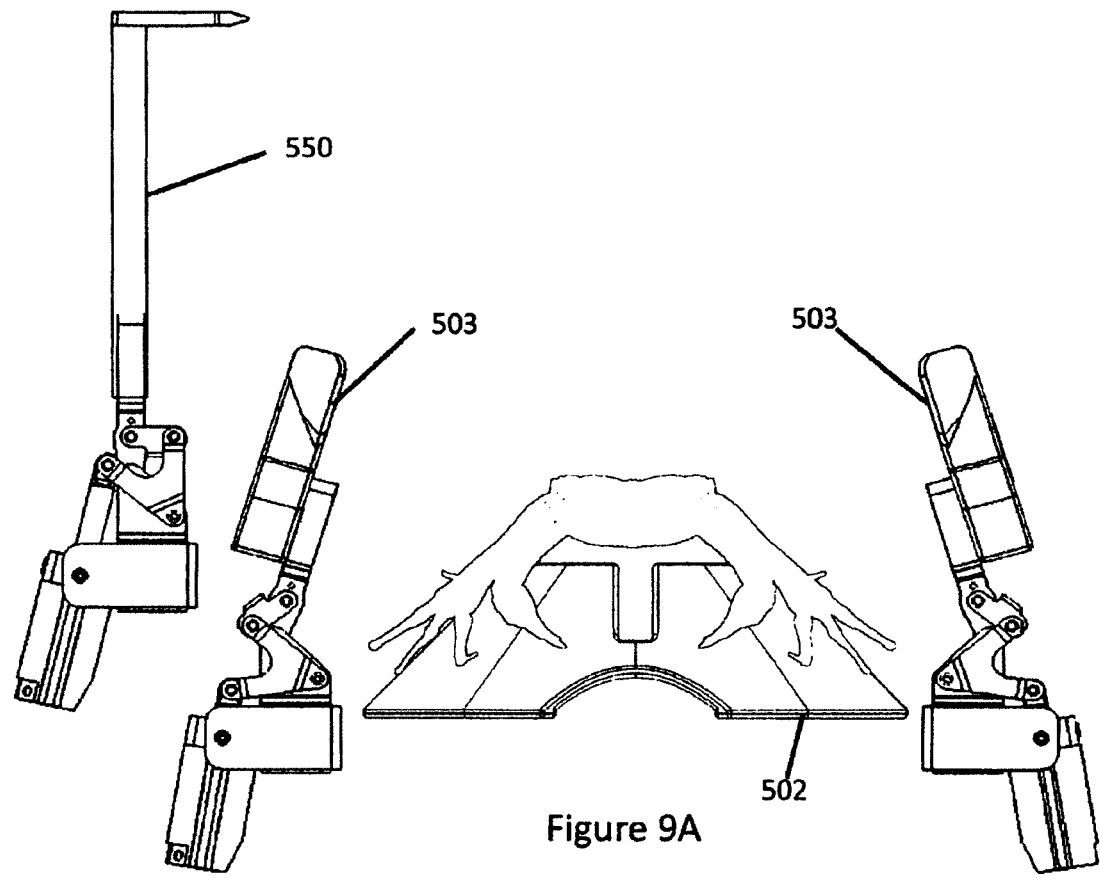
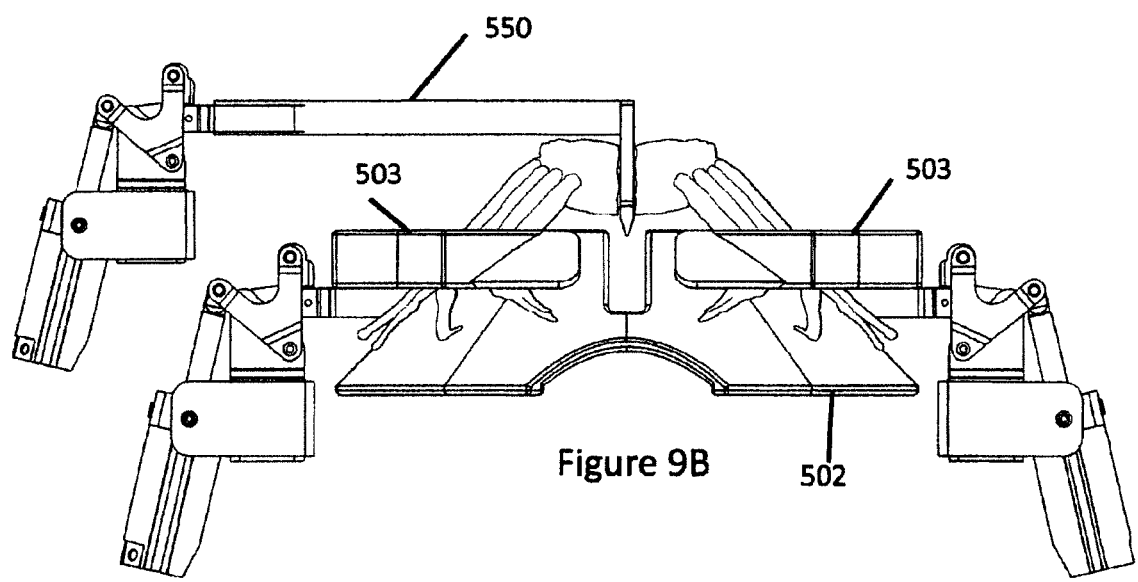

SENSOR-GUIDED AUTOMATED METHOD AND SYSTEM FOR PROCESSING CRUSTACEANS

CROSS REFERENCE TO RELATED APPLICATIONS

This application is a continuation of U.S. patent application Ser. No. 15/762,783, filed Mar. 23, 2018 (pending), which is a U.S. National Phase application of International Application No. PCT/CA2016/000238, filed Sep. 20, 2016 (expired), which claims the priority of Canadian Patent Application No. 2,904,958, filed Sep. 24, 2015, the disclosures of which are incorporated by reference herein in their entirety.

FIELD OF THE INVENTION

The present invention relates to a method and system for processing larger-bodied species of decapod crustacean animals, primarily crab and lobster. More particularly, the present invention relates to a sensor-guided, automated method and system for processing such crustaceans.

BACKGROUND OF THE INVENTION

Larger-bodied species of decapod crustacean animals, such as crab, are typically processed for their high valued meat. In this respect, they have historically been butchered by hand, with the meat then extracted manually using shears or scissors and packaged for shipment. Crab have also often been packaged as pre-cooked clusters comprising the crab's legs, claws and shoulder meat, which are then sold for consumption in that form. Regardless of the form of the final product, because labour rates are extremely low in many Asian countries, manual processing has largely shifted over time from North American plants to those in low-wage countries. This has led to a loss of jobs in previous crab processing hot-spots like Newfoundland, Canada. Thus, in order to better compete, crab processors have developed various machines to assist in automating various steps in the process. In the result, today crab clusters are typically processed using both manual and semi-automated processing methods.

The conventional method for cluster production is referred to as butchering. In such a method, live crab are manually butchered and cleaned by a worker at one of a plurality of workstations at a butchering table. Shown in FIGS. 1A and 1B are simplified front and side views, respectively, of a butchering table 100 that is known in the art, while FIG. 1C shows a simplified perspective view of such a butchering table 100. FIG. 1D, on the other hand, shows a simplified front view of a crab 102 prior to butchering. For explanatory purposes, crab 102 has a "centre body portion" generally comprising a carapace or "cap" 106 (a protective shell located on the top of crab 102) and an underside or "belly" 108 (which is also a protective shell that is not as hard or rigid per se as the cap 106), as well as appendages 104, including claws, claw arms and shoulders 110 located above appendages 104. To butcher crab 102, a worker picks up crab 102 by its appendages, with one hand located proximate each of the crab's shoulders 110, and then plunges "belly" 108 of crab 102 onto a stationary anvil-like device 112 of butchering table 100, as shown in FIG. 1B, thereby effectively splitting crab 102 in half, into two clusters. Simultaneously, cap 106 is torn away from crab 102 and two crab clusters 116 are formed, as shown in FIG. 1E, with shoulder meat 118 attached thereto. Shoulder meat 118 of each cluster 116 is then simultaneously pushed onto a rotating brush 120 located on either side of the stationary anvil-like device 112 to clean each cluster 116 by, for example, removing the gut and gills (not shown) of crab 102. A semi-automated method for butchering crab is more fully detailed in U.S. Pat. No. 5,401,207 to Hicks and Therien. Chungha Machinery Co., Ltd. of Korea (CHAMCO) manufactures a machine that severs appendages from the shoulder of a crab by means of a vertically rotating blade that makes a blind cut based on where the appendages are manually placed on a conveyor belt. [see https://www.youtube.com/watch?v=KhHEwYKMtPc for instance]

At present, there is no known technology that can butcher a crab in a fully automated fashion, nor is there a single system that is sophisticated enough to butcher crab into a variety of different crab portions (some specific and non-limiting examples of which include centre body portions, clusters, individual shoulder meat, and individual legs and claws), without manual intervention. While there is some technology currently available for the semi-automatic production of crab portions, as discussed above, that technology lacks the flexibility to readily butcher crab into a variety of crab portions. Existing automated technology also lacks the precision needed to efficiently, accurately, and repeatedly create high quality crab products for successful commercial sale. It is for this reason that the majority of global crab products are processed in a manner that requires a significant amount of manual labour. Greater and more precise automation of crab processing is therefore highly desired, especially in areas where wages in the local crab industry are not competitive with those in low-wage Asian countries.

The present invention seeks to overcome some of the deficiencies in the prior art.

SUMMARY OF THE INVENTION

Given that larger-bodied species of decapod crustacean animals, specifically crab and lobster, are harvested from nature and can vary in size, general anatomical features, and appearance, successful commercial processing of such crustaceans by automated means is only achievable by a system that is not "fixed" per se in its automation, but rather by one that is instead "flexible" and capable of adjustment in respect of each crustacean that is processed. The present invention provides a sensor-guided, automated system that is capable of intelligently butchering crustaceans. More particularly, the present system is capable of effectively butchering each individual crustacean in response to how the system's sensor(s) assess the physical characteristics of each crustacean as it arrives via a conveyor belt. In addition, the sensor-guided, automated system of the present invention is capable of producing a plurality of crustacean portions, as directed, specific and non-limiting examples of which include centre body portions, legs, claws, appendages, shoulder meat, caps, clusters and any combination thereof.

Therefore, in accordance with one embodiment of the present invention there is provided a sensor-guided automated system that is capable of intelligently cutting a large-bodied decapod crustacean into a plurality of portions, said system comprising: (i) an intake apparatus for receiving the crustacean; (ii) a sensor-guided positioning system for: (a) determining the presence, location, orientation and size of the crustacean on the intake apparatus; (b) coupling with the crustacean; and (c) placing the crustacean into a holding system for retaining the crustacean in an optimal fixed position for subsequent cutting; (iii) a sensor-guided butchering system for: (a) determining locations on the crustacean to be cut based on a desired output of crustacean portions; and (b) cutting the crustacean at the locations to produce optimal crustacean portions; and (iv) an outlet apparatus for discharging the crustacean portions from the system for subsequent further processing or packaging. The intake apparatus may comprise a belt conveyor system, including a translucent conveyor belt having a light source secured in a location under an upper, inner surface of such a translucent conveyor belt. The sensor-guided positioning system comprises a first sensor camera associated with pattern recognition software for determining the presence, location, orientation and size of the crustacean on the intake apparatus, and a sensor-guided movement apparatus for coupling with the crustacean and placing the crustacean into the holding system for retaining the crustacean in the optimal fixed position for subsequent cutting. The holding system comprises: a saddle having a surface that is shaped to contour with a general surface of a carapace of the crustacean for stable positioning of the crustacean in the holding system; a fixture, an upper-most portion of which is positioned below the saddle, that allows appendages of the crustacean to supportively hang away from a centre body portion of the crustacean; and at least one clamp that is capable of effectively holding the crustacean in place with sufficient pressure during cutting without damaging the appendages. The fixture is frustoconically shaped, resembling an inverted cone, having its upper-most portion cut off providing an opening around a periphery of the saddle, and is preferably not coupled to the saddle to allow for the free movement of the saddle in relation thereto. The clamp(s) have a portion that engages the appendages of the crustacean and that is shaped to correspond to an outer surface of the fixture. The sensor-guided butchering system comprises a second sensor camera associated with pattern recognition software for determining the locations on the crustacean to be cut based on the desired output of crustacean portions, a sensor-guided cutting apparatus for cutting the crustacean at the locations to produce the optimal crustacean portions, and a butchering bar that is capable of effectively splitting a centre body portion of the crustacean in two pieces. The outlet apparatus comprises a belt conveyor system.

In another embodiment of the present invention there is provided a sensor-guided automated system that is capable of intelligently cutting a large-bodied decapod crustacean into a plurality of portions, said system comprising: an intake apparatus for receiving the crustacean; a holding system for holding the crustacean in an optimal fixed position when butchering the crustacean; a sensor-guided positioning system having a first sensor for sensing the crustacean on the intake apparatus, pattern recognition software associated with the first sensor for determining the position, orientation and size of the crustacean on the intake apparatus, and a sensor-guided movement apparatus for moving the crustacean from the intake apparatus to the holding system; a sensor guided butchering system having a second sensor for sensing the crustacean in the holding system, pattern recognition software associated with the second sensor for determining the position, orientation and size of the crustacean in the holding system, and for determining a plurality of locations on the crustacean for cutting the crustacean, the locations dependent on the determined position, orientation and size of the crustacean, and a sensor-guided cutting apparatus for cutting the crustacean at the plurality of locations to create a plurality of crustacean portions; and an outlet apparatus for receiving the plurality of crustacean portions from the holding system after the crustacean has been cut into the plurality of crustacean portions for subsequent packaging. The intake apparatus may comprise a belt conveyor system and receives the crustacean belly-up, such that the carapace of the crustacean is laid on the belt conveyor system. A light source may be located under the belt conveyor system for illuminating an area immediately around the crustacean to create a silhouette of the crustacean when the crustacean is in a field of view of the first sensor. The first sensor comprises a first sensor camera having a field of view over a portion of the belt conveyor system for capturing images of the crustacean. The pattern recognition software processes the images of the crustacean and generates image data of the crustacean, comprising determining the location, orientation and size of the crustacean. The sensor-guided movement apparatus comprises a robotic arm having a coupling device, preferably a vacuum gripper, attached thereto for detachably coupling to the crustacean for moving the crustacean from the intake apparatus to the holding system. The holding system comprises: a saddle having a surface contoured to mate with a centre body portion of the crustacean; a fixture for supporting appendages of the crustacean; and one or more clamps for retaining the crustacean in a fixed position by holding the appendages of the crustacean against the fixture. The surface of the saddle is contoured to mate with a centre body portion of the crustacean on a carapace of the crustacean. The fixture has a frustoconical-like shape with a top opening and a bottom opening, the top opening situated proximate an underside of the saddle when the saddle is in an "up" position. The saddle may be attached to a hinged support for moving the saddle between the "up" position and a "down" position wherein the saddle is located below the bottom opening of the fixture. The automated system may have a butcher bar that is capable of driving through the centre body portion of the crustacean while the crustacean is mated with the surface of the saddle for dividing the centre body portion of the crustacean into two pieces and dislodging a carapace from the crustacean body. The second sensor comprises a second camera for capturing images of the crustacean when the crustacean is mated with the surface of the saddle. The pattern recognition software associated with the second sensor processes the images of the crustacean and generates image data of the crustacean. The sensor guided cutting apparatus comprises a robot having a cutting tool. The cutting tool is a rotating blade having 6 degrees of freedom for cutting the crustacean.

In yet another embodiment of the present invention there is provided an automated method for commercial butchering of a crustacean comprising: receiving a crustacean on an intake apparatus; sensing a presence of the crustacean on the intake apparatus with a first sensor; determining location, orientation and size data of the crustacean on the intake apparatus by means of the first sensor in association with pattern recognition software and transmitting said data to a movement apparatus; coupling the crustacean with the movement apparatus and moving the crustacean from the intake apparatus to a holding system with said movement apparatus; retaining the crustacean in a fixed position in the holding system for subsequent butchering; sensing and determining the location, orientation and size of the crustacean in the holding system by means of a second sensor in association with pattern recognition software; generating cutting data based on the location, orientation and size of the crustacean in the holding system as determined by means of the second sensor in association with pattern recognition software comprising a plurality of optimal locations on the crustacean to cut to create various crustacean portions as desired; transmitting the cutting data to a cutting tool and cutting the crustacean at one or more of the plurality of optimal locations to create the desired crustacean portions; and releasing the crustacean portions from the holding system.

In yet a further embodiment of the present invention there is provided a sensor-guided automated system that is capable of intelligently cutting a large-bodied decapod crustacean into a plurality of portions, said system comprising: (i) an intake apparatus for receiving the crustacean; (ii) a sensor-guided positioning system for: (a) determining the presence, location, orientation and size of the crustacean on the intake apparatus; (b) determining locations on the crustacean to be cut based on a desired output of crustacean portions; (c) coupling with the crustacean; and (d) placing the crustacean into a holding system for retaining the crustacean in an optimal fixed position for subsequent cutting; (iii) a sensor-guided butchering system for cutting the crustacean at the locations to produce optimal crustacean portions; and (iv) an outlet apparatus for discharging the crustacean portions from the system for subsequent further processing or packaging. The intake apparatus may comprise a belt conveyor system. The sensor-guided positioning system comprises a sensor camera associated with pattern recognition software for determining the presence, location, orientation and size of the crustacean on the intake apparatus as well as the locations on the crustacean to be cut based on the desired output of crustacean portions, and a sensor-guided movement apparatus for coupling with the crustacean and placing the crustacean into the holding system for retaining the crustacean in the optimal fixed position for subsequent cutting. The holding system comprises: a saddle having a surface that is shaped to contour with a general surface of a carapace of the crustacean for stable positioning of the crustacean in the holding system; a fixture, an upper-most portion of which is positioned below the saddle, that allows appendages of the crustacean to supportively hang away from a centre body portion of the crustacean; and at least one clamp that is capable of effectively holding the crustacean in place with sufficient pressure during cutting without damaging the appendages. The fixture is frustoconically shaped, resembling an inverted cone, having its upper-most portion cut off providing an opening around a periphery of the saddle, and is preferably not coupled to the saddle to allow for the free movement of the saddle in relation thereto. The clamp(s) have a portion that engages the appendages of the crustacean and that is shaped to correspond to an outer surface of the fixture. The sensor-guided butchering system comprises a sensor-guided cutting apparatus for cutting the crustacean at the locations to produce the optimal crustacean portions, and a butchering bar that is capable of effectively splitting a centre body portion of the crustacean in two pieces. The outlet apparatus comprises a belt conveyor system.

In yet another embodiment of the present invention there is provided a holding system for use in a sensor-guided automated system that is capable of intelligently cutting a large-bodied decapod crustacean into a plurality of portions, said holding system comprising a saddle having a surface that is shaped to contour with a general surface of a carapace of the crustacean for stable positioning of the crustacean in the holding system prior to cutting said crustacean into a plurality of portions. The holding system may further comprise a fixture, an upper-most portion of which is positioned below the saddle, and that allows appendages of the crustacean to supportively hang away from a centre body portion of the crustacean. In addition, the holding system may further comprise at least one clamp that is capable of effectively holding the crustacean in place with sufficient pressure during cutting without damaging the appendages.

BRIEF DESCRIPTION OF THE DRAWINGS

Various embodiments of the present invention will now be described, by way of example, with reference to the accompanying drawings in which:

FIG. 9A is a simplified front view of a crab in a saddle and fixture, with the clamps in an "open" position and a butcher bar in an "up" position;

FIG. 9B is a simplified front view of a crab in a saddle and fixture, with the clamps in a "closed" position and a butcher bar in a "down" position;

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1A:
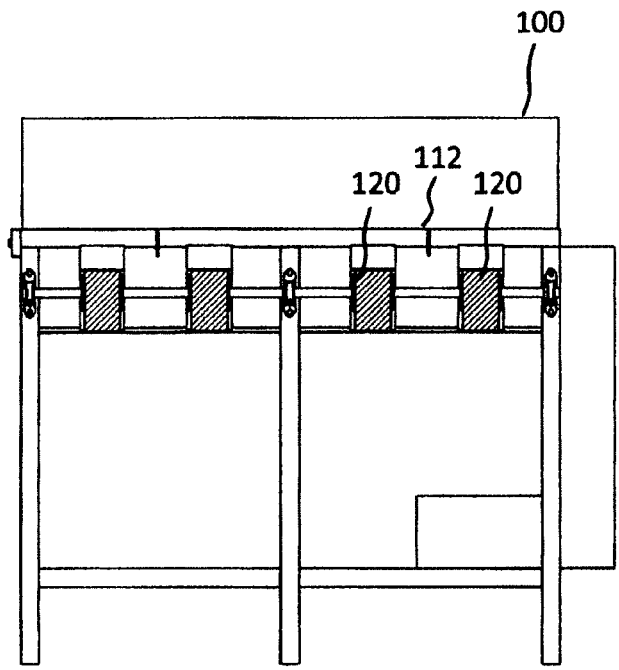
FIG. 1A is a simplified front view of a butchering table found in the prior art.
Figure 1B:
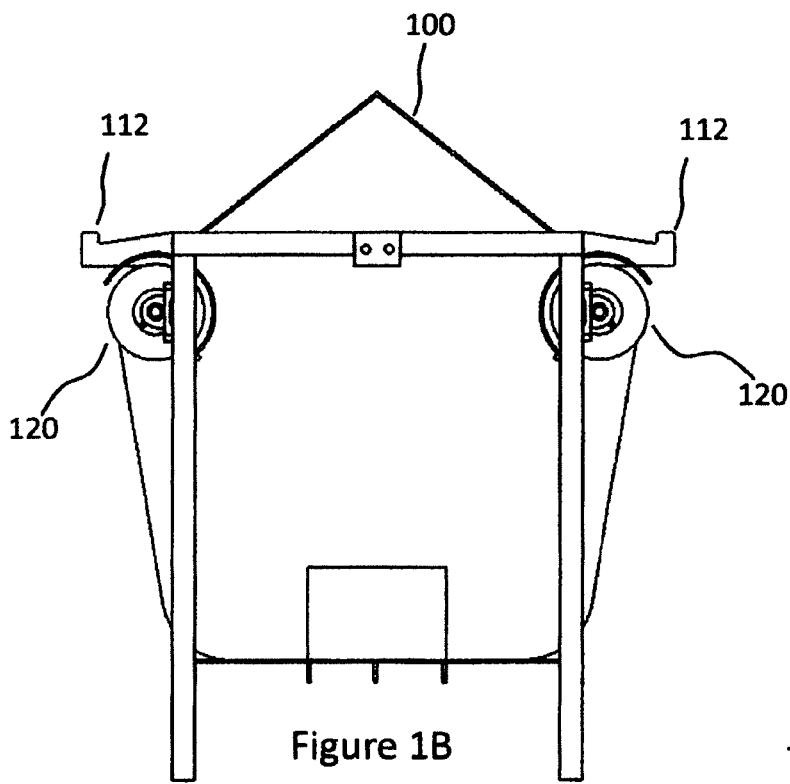
FIG. 1B is a simplified side view of a butchering table found in the prior art.
Figure 1C:
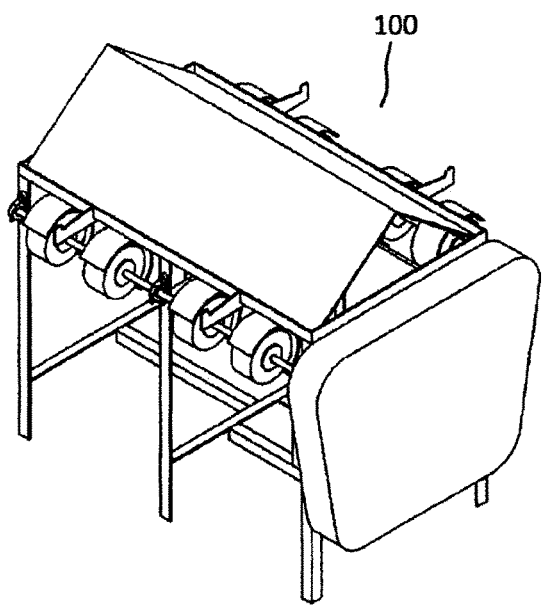
FIG. 1C is a simplified perspective view of a butchering table found in the prior art.
Figure 1D:
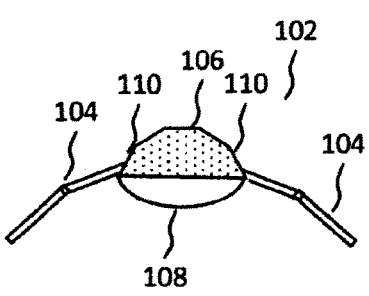
FIG. 1D is a simplified front view of a crab.
Figure 1E:
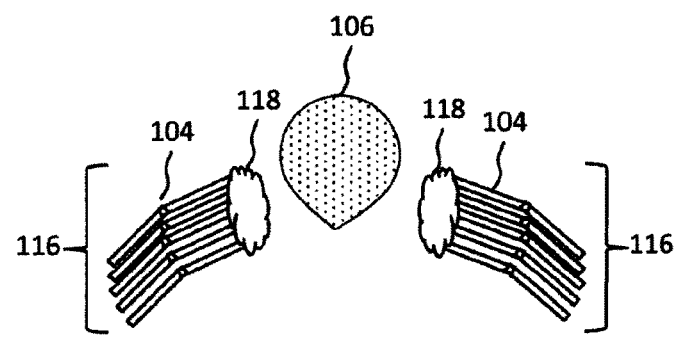
FIG. 1E is a simplified top view of crab portions post-butchering.
Figure 2A:
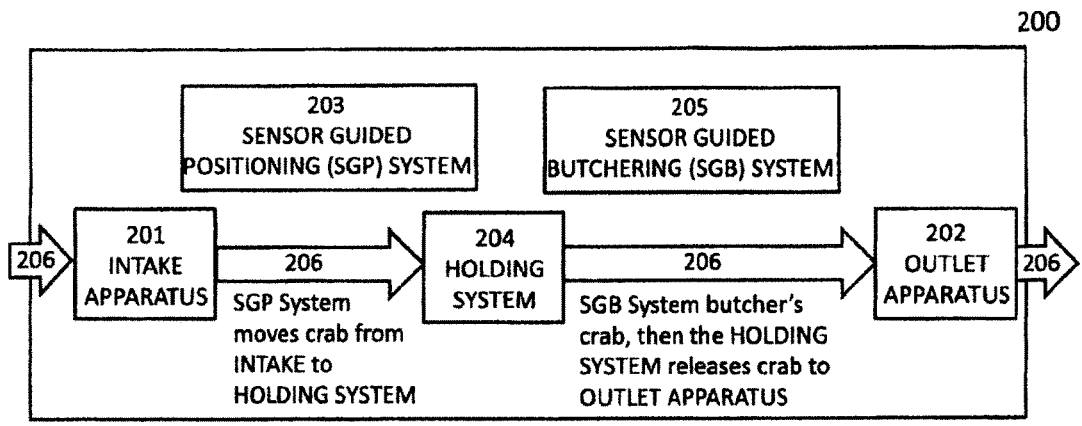
FIG. 2A is a simplified high level functional block diagram of an embodiment of a sensor guided system according to a preferred embodiment of the invention.

Shown in FIG. 2A is a simplified high level functional block diagram of an embodiment of a sensor-guided system 200 for processing crab in accordance with the present invention. When the term "crab" is used herein, it is generally meant to apply to other larger-bodied species of decapod crustacean animals as well, such as lobster. Arrows 206 in FIG. 2A illustrate the path taken by a crab during processing. System 200 generally comprises:

(i) an intake apparatus 201 for receiving crab;
(ii) a sensor-guided positioning ("SGP") system 203 for: determining the presence, location, orientation and size of the crab on the intake apparatus 201 (and optionally the locations on a crab body to be cut based on the desired output of crab portions); coupling the crab; and placing the crab into holding system 204 for butchering;
(iii) a holding system 204 for retaining the crab in an optimal fixed position for butchering;
(iv) a sensor-guided butchering ("SGB") system 205 for: optionally determining the locations on a crab body to be cut based on the desired output of crab portions (if not provided for in the SGP system); and cutting the crab at the chosen locations to produce optimal crab products; and
(v) an outlet apparatus 202 which discharges the butchered crab from system 200 for further processing and/or packaging.

Figure 2B:
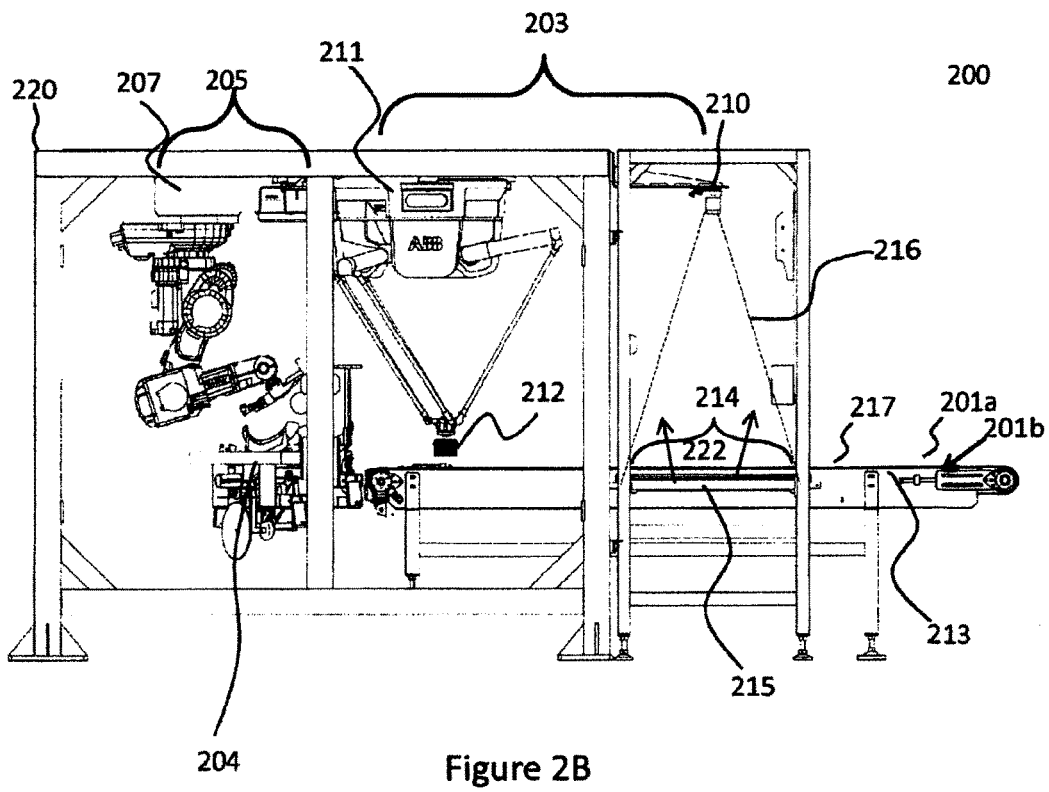
FIG. 2B is a simplified side view of an exemplary embodiment of a responsive sensor-guided system of the present invention.

Shown in FIG. 2B is a simplified side view of an exemplary embodiment of the sensor-guided system 200 according to the present invention. Here, system 200 is shown with a housing 220, namely a rigid frame that is capable of providing structural support to the various apparatus that comprise the system of the present invention. However, housing 220 may not be necessary if, for instance, the various apparatus can be used in a stand-alone manner. If used, housing 220 would also generally include doors and panels (not shown) that may act as safety mechanisms, for instance, in the event of a collision resulting in breakage of the cutting blade (not shown), or simply for the safety of personnel.

The intake apparatus 201 may be any device that is capable of supplying crab to the SGP system 203 in a generally uniform manner. In a preferred embodiment, the intake apparatus 201 comprises a belt conveyor system 201a. In a more preferred embodiment, the intake apparatus 201 comprises a belt conveyor system 201a having a sufficiently durable conveyor belt 201b (which may be translucent and made of thermoplastic polyurethane for instance, a suitable example of which is produced by Novex, Inc. as NOVITANE® FG-90/85-K(8)), with a light source 215 secured in a location both under an inner surface 213 of said conveyor belt 201b and directly under a first sensor camera 210 of the SGP system 203 (described more fully below) when a translucent belt is used, as shown in FIG. 2B. A preferred light source 215 employs LED light modules that are resistant to damage from shock or vibration, and whose freedom from frequency oscillation makes them especially suitable for high-speed digital cameras and the like (a suitable example of which is produced by Smart Vision Lights with their Machine Vision Light Product Line, back light LLP series).

The SGP system 203 generally comprises several parts/apparatus, namely a first sensor camera 210 (with optional backlight as deemed necessary; not shown) associated with pattern recognition software, and a sensor-guided movement apparatus 211. The first sensor camera 210 may be any camera or similar sensor that is capable of being used in association with pattern recognition software to adequately and reliably identify the presence, location, orientation and size of the crab on the intake apparatus 201; and, optionally, if detailed images are desired and available with camera 210, the locations on the crab body to be cut based on the desired output of crab portions. It has been found that a camera under the trademark Cognex In-Sight 5400™ (greyscale, 640×480 pixel resolution with 8 bit dynamic range) or Cognex In-Sight 5403™ (greyscale, 1600×1200 pixel resolution with 8 bit dynamic range) comprising pattern recognition software such as In-Sight Explorer under the trademark PatMax™ by Cognex Corporation (see http://www.cognex.com/products/machine-vision/in-sight-explorer-software/ for more specific details, for instance) is sufficient for this purpose depending on the requisite level of detail in the scanned images (discussed more below). In fact, the In-Sight Explorer software contains configuration software that allows a person skilled in the art to readily select and configure the data to be sent, as well as the protocol to use for communicating with the sensor-guided movement apparatus 211. PatMax™ is, however, a proprietary Windows based software tool wherein the underlying logic and code itself is hidden from the user. The sensor-guided movement apparatus 211 may be any apparatus that is capable of using the information supplied by a processor associated with sensor camera 210 and associated pattern recognition software to couple with/grip the crab and properly place it in holding system 204, which, as noted above, retains the crab in an optimal fixed position for subsequent butchering. It has been found that a pick and place robot such as the IRB 360 FlexPicker™ by ABB, and having a vacuum gripper 212, is capable of operating sufficiently as the sensor-guided movement apparatus 211 (see http://new.abb.com/products/robotics/industrial-robots/irb-360 for more specific details, for instance).

Figure 5:
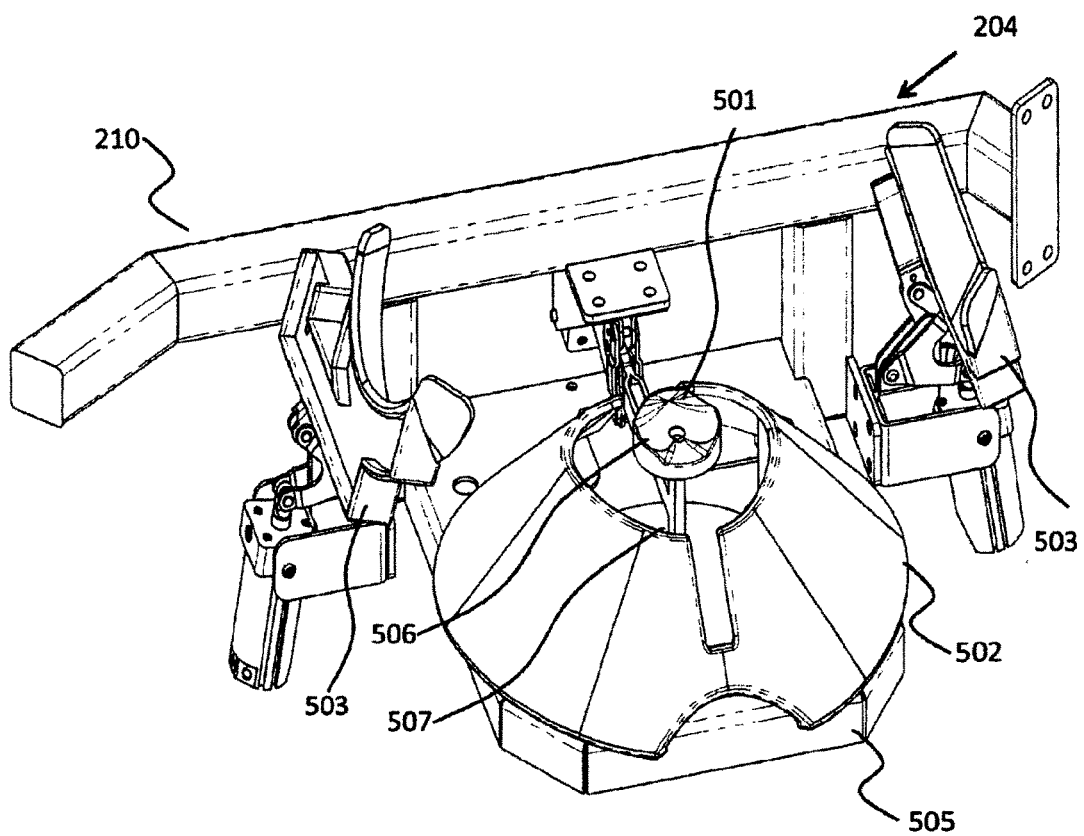
FIG. 5 is a simplified perspective view of a holding system according to an embodiment of the invention.
Figure 6A:
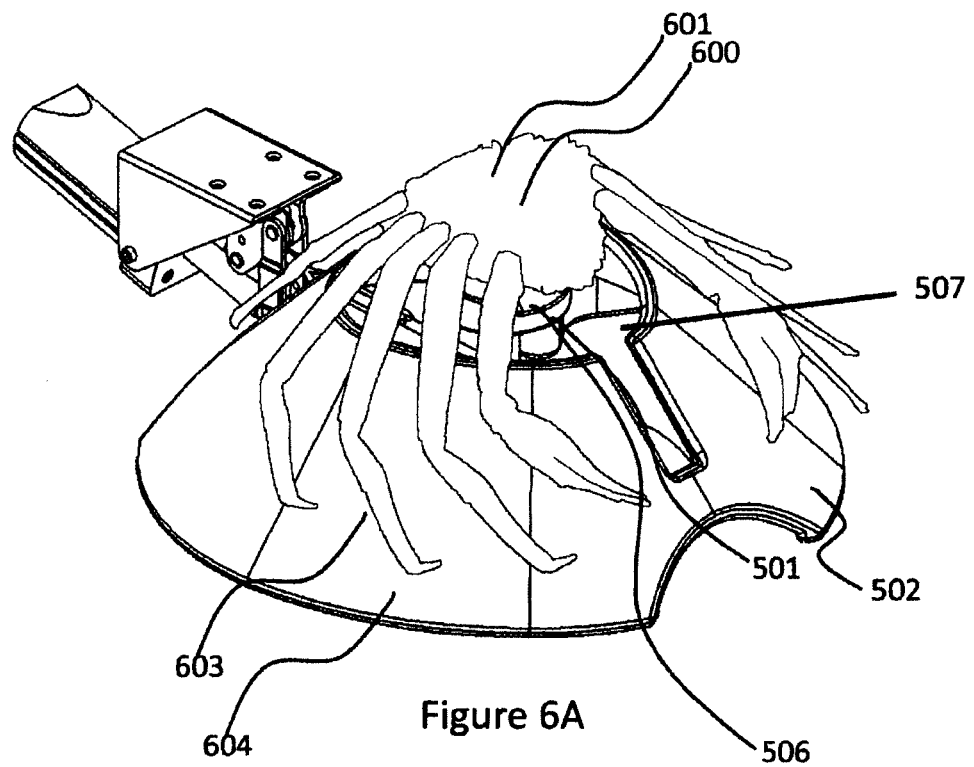
FIG. 6A is a simplified front perspective view of a fixture, saddle support, and saddle, with a "belly up" crab laid thereon.
Figure 6B:
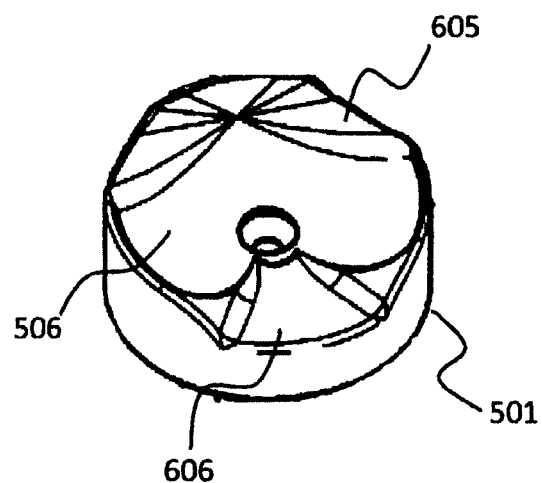
FIG. 6B is a simplified close-up perspective view of a saddle and its contoured surface.
Figure 6C:
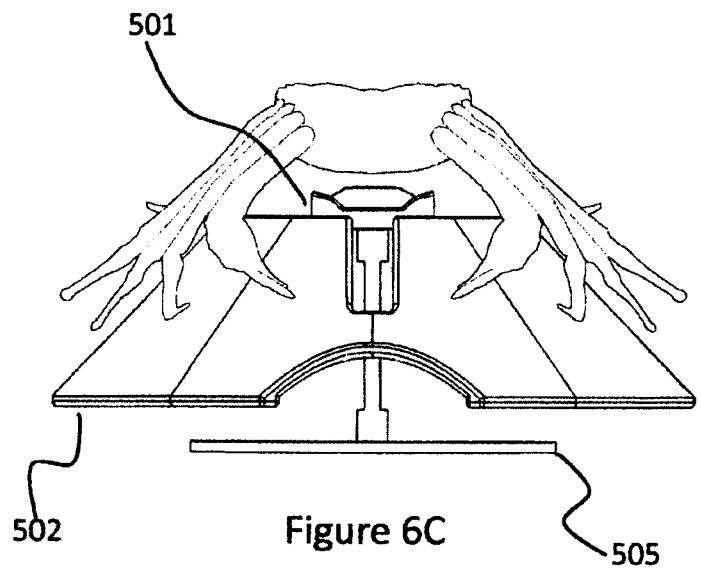
FIG. 6C is a simplified front view of a fixture, a saddle support, and a saddle, with a "belly up" crab shown slightly there-above.
Figure 6D:
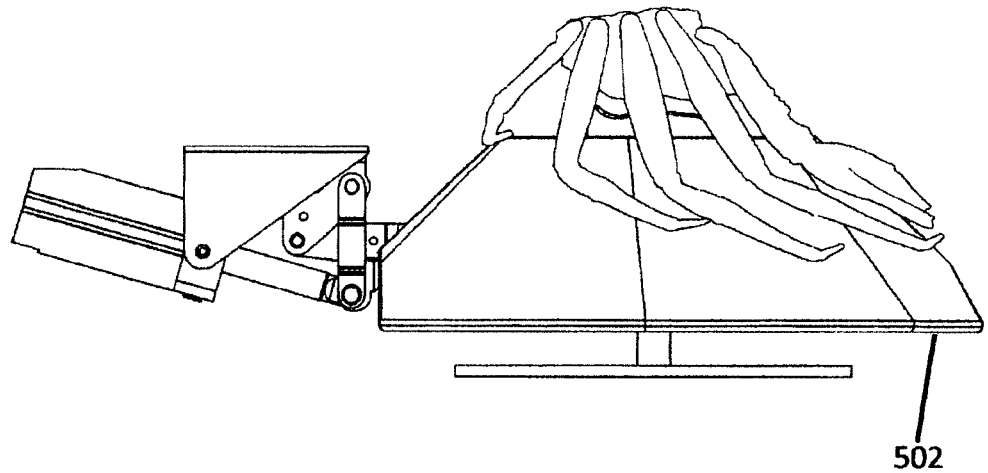
FIG. 6D is a simplified side view of a fixture, a saddle support, and a saddle, with a "belly up" crab shown slightly there-above.
Figure 7A:
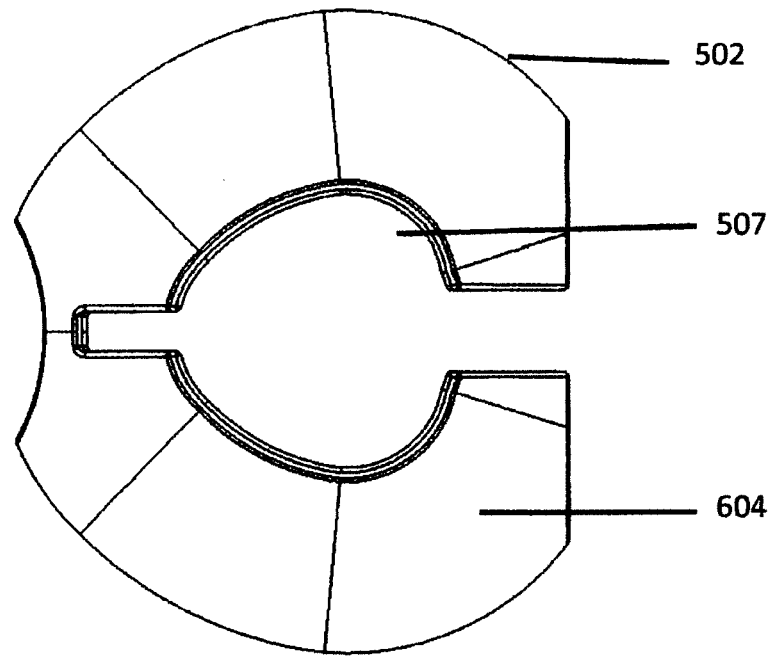
FIG. 7A is a simplified top view of a fixture according to an embodiment of the invention.
Figure 7B:
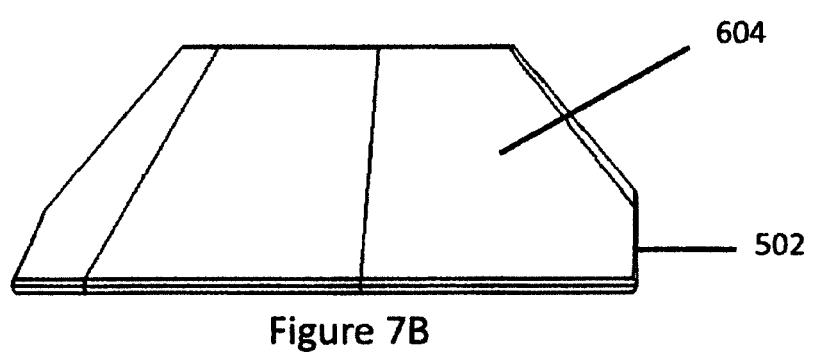
FIG. 7B is a simplified side view of a fixture according to an embodiment of the invention.
Figure 7C:
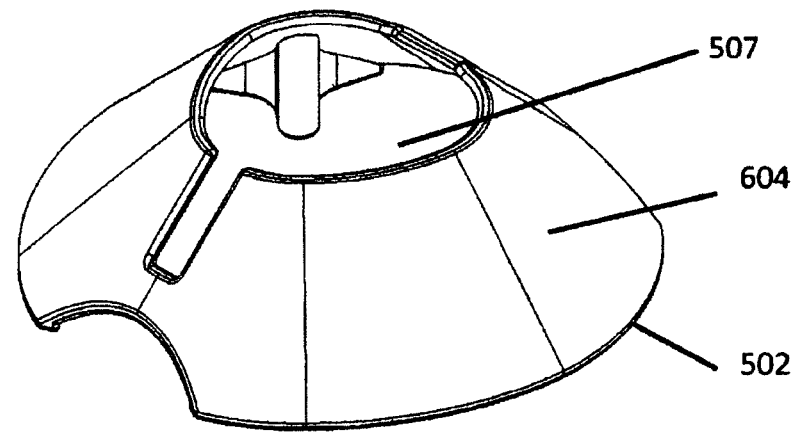
FIG. 7C is a simplified side perspective view of a fixture according to an embodiment of the invention.

The holding system 204 generally comprises several parts/apparatus, namely a saddle 501, a fixture 502, and one or more clamps 503, as shown in FIG. 5. The saddle 501 may be hingedly connected to a frame 210 for support, as shown in FIGS. 5, 6A, and 6D, and/or in order to allow the saddle 501 to be raised or lowered, if desired, through an opening in fixture 502 (described below), as shown in FIG. 7A. Such raising and lowering of saddle 501 may be desired in order to easily replace saddle 501 (for e.g. for the processing of different species of crab), or in order to assist in moving butchered crab onto outlet apparatus 202. Saddle 501 has a surface 506 that is shaped to contour with the general surface of the carapace (or cap) 106 of a crab (see e.g. 605, 606, as shown in FIG. 6B), thereby allowing for the stable positioning of the crab in holding system 204 prior to clamping, and to assist with the optimal cutting and cleaning of the crab. Surface 506 of saddle 501 may be contoured in a method as follows, using Snow Crab as the species for this example. Firstly, given that Snow Crab that are processed have carapace widths generally between 3.75" and 5.5", the goal is to achieve a surface 506 that is capable of sufficiently mating with the vast majority of Snow Crab carapaces that will be encountered. In order to do this, it is necessary to sample a sufficiently large number of Snow Crabs having carapaces within the full range of widths (e.g. 10), take 3-dimensional shapes of these carapaces via 3D scanning, and generate an average shape (model) of a Snow Crab carapace that will sufficiently contour as desired for processing. A matching negative profile of the model is then created, and the saddle surface 506 derived by means of a 3D printer. It is preferable that a wedge of material is removed from the location on the surface 506 of the saddle 501 that matches the protrusion in the Snow Crab carapace near the location of its eyes, while two additional cut-outs may be made on the opposing side of the surface 506 which matches known protrusions in the Snow Crab carapace at these locations. Fixture 502 is preferably not coupled to saddle 501 (to allow for the separate raising and lowering of saddle 501 as noted above), and is preferably frustoconically shaped, resembling an inverted cone with its top, upper-most portion cut off (see opening 507). Opening 507 of fixture 502 is positioned slightly below saddle 501 to allow the crab's appendages to hang down and away from the centre body portion of the crab (see FIG. 6A), while being supported by the outer surface 604 of fixture 502 at an appropriate angle, such that the appendages do not over-extend their natural extension capability which would otherwise potentially cause damage to the crab meat and/or negatively affect processing. Opening 507 must also be sufficient to provide clearance for the sensor-guided cutting apparatus 207 during cutting of the appendages (discussed below). Clamp(s) 503 are preferably capable of moving between an "open" position to allow for the placement of a crab on saddle 501 and fixture 502 (see FIGS. 5 and 8A), and a "closed" position that is capable of effectively holding a crab in place with sufficient pressure during the cutting phase but without damaging the appendages (see FIG. 8B). Moreover, clamp(s) 503 are preferably shaped such that the portion thereof that engages a crab's appendages (as shown in FIG. 8B) generally corresponds to the shape of the outer surface 604 of fixture 502 at the point of engagement.

The SGB system 205 generally comprises several parts/apparatus, namely an optional second sensor camera [not shown] associated with a processor and pattern recognition software, a sensor-guided cutting apparatus 207, and optionally a butchering bar 550. The second sensor camera associated with pattern recognition software is stated to be optional (and is not necessary) if camera 210 and associated pattern recognition software of the SGP system 203 has high enough resolution and is configured to be capable of detailing the shape, orientation and size of the crab with high accuracy, as well as the locations on the crab body to be cut, and if the SGP system 203 is capable of conveying this information to the sensor-guided cutting apparatus 207, and if the sensor-guided movement apparatus 211 is capable of placing the crab in the holding system 204 in an optimal fixed position for subsequent butchering with high accuracy. Otherwise or regardless, it has been found that a camera under the trademark Cognex In-Sight 5403™ (greyscale, 1600×1200 pixel resolution with 8 bit dynamic range) and software such as In-Sight Explorer under the trademark PatMax™ by Cognex Corporation (see http://www.cognex.com/products/machine-vision/in-sight-explorer-software/ for more specific details, for instance) is sufficient for this purpose. The sensor-guided cutting apparatus 207 may be any apparatus that is capable of using the information supplied by the processor to accurately cut the crab body at specific locations to produce optimal crab products based on a user's desired output of crab portions. In this respect, it has been found that it is preferable that the cutting apparatus 207 uses a plunging motion with a circular blade in order to cut a crab's appendages, or that a high pressure water jet cutting apparatus be used. It has been found that a robot such as the IRB 140 FoundryPlus™ version by ABB that is IP67 protected, with a rotating cutting blade having 6 degrees of freedom, is capable of precision butchering as the cutting apparatus 207. The butchering bar 550 may be any bar that is capable of effectively splitting the centre body portion of the crab in two pieces, and should be made from stainless steel or other food grade material(s).

The outlet apparatus 202 (not shown) may be any device that is capable of taking the various crab portions away from the system once the butchering process has been completed for transfer to subsequent processing and/or packaging. In this respect, the outlet apparatus 202 may comprise, for instance, a belt conveyor system that is capable of transporting crab appendages that are displaced thereon once the clamp(s) 503 have been disengaged from the butchered crab. Similarly, a belt conveyor system may be employed to transport any crab portions that are displaced from saddle 501 (e.g. when saddle 501 has been lowered to allow the crab portion(s) to displace therefrom). Other applicable outlet apparatus 202 would be well known to persons skilled in the art.

Hereinafter is described a method by which a crab is processed from the time it enters the intake apparatus 201 to the time it leaves the outlet apparatus 202 in accordance with a preferred embodiment of the present invention, and whereby further details will be provided for the sensor-guided system 200, as necessary, to ensure that a person skilled in the art can make and work the invention as described.

In operation, crab must firstly be placed on a proximal end of a moving conveyor belt 201b on a belt conveyor system 201a, whether done manually or in an automated fashion known by persons skilled in the art, but such placement should preferably occur in a generally uniform (and sufficiently spaced) manner to allow the SGP system 203 to operate efficiently and effectively as the crab are processed in order of placement. Furthermore, because the carapace 106 of a crab is often covered in seaweed, barnacles and other ocean debris (whereas the belly 108 of a crab is usually much cleaner and smooth), the preferred embodiment of the present system has been designed such that crabs are to be placed on conveyor belt 201b in a "belly up" position (i.e. the crab's carapace 106 is in contact with outer surface 217 of conveyor belt 201b). Not only does this allow the camera 210 and pattern recognition software to more accurately and reliably identify the presence, location, orientation and size of the crab on conveyor belt 201b (as will be more fully discussed below), but it also provides a better surface to which vacuum gripper 212 can couple to the crab, and ultimately allows the sensor-guided movement apparatus 211 to readily place the carapace 106 of the crab into the saddle 501 without the need for any means to invert the crab prior thereto (since saddle 501 has been specially designed (as discussed above) to have a surface 506 with contours matching the carapace 106 of a crab for adequate mating thereto).

Figure 3:
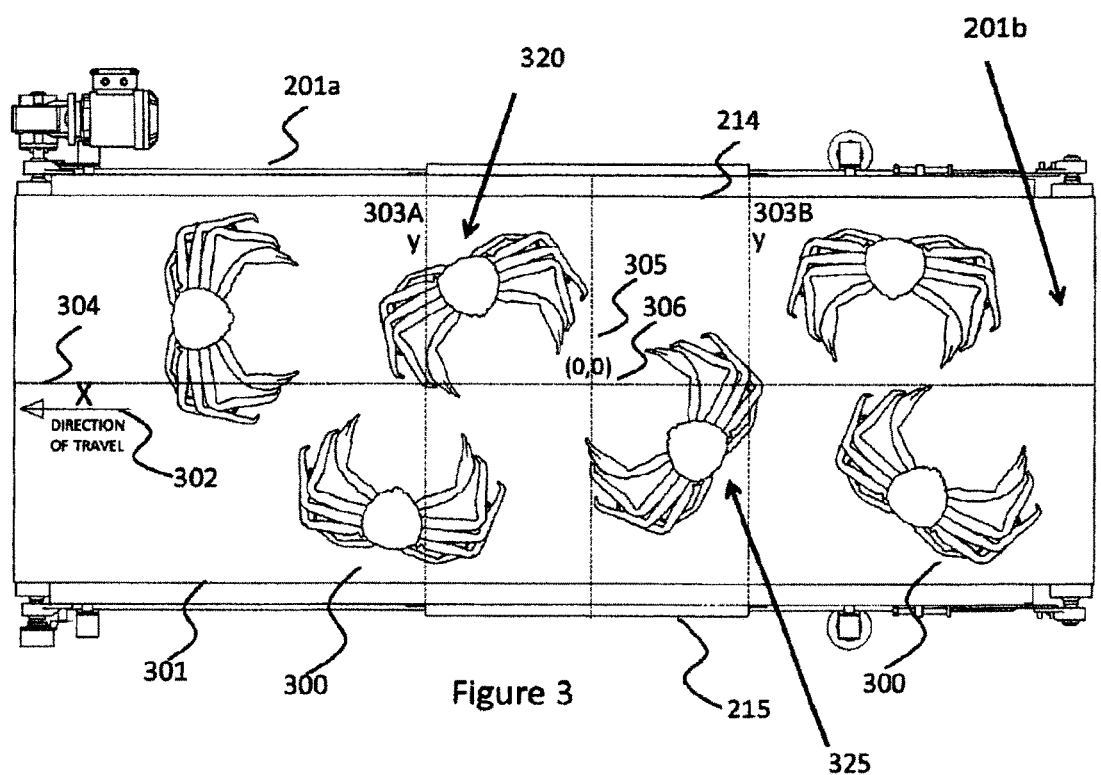
FIG. 3 is a simplified top view of an intake apparatus, a conveyor belt, according to an embodiment of the invention.

The "belly-up" crab moves along the conveyor belt 201b horizontally in the x-axis direction of the two-dimensional x-y plane of conveyor belt 201b (as seen from above) from the proximal end of crab placement toward camera 210 and sensor-guided movement apparatus 211, as indicated by arrow 302 in FIG. 3. In this respect, camera 210 and associated pattern recognition software have been devised to operate such that the location of the centre-point (centroid) of the centre body portion of each crab may be tracked as a simulated (x,y) coordinate on conveyor belt 201b (among other coordinates as will be discussed more fully below) as the crab moves along the conveyor belt 201b. To be specific, however, a crab is not located by the camera 210 and associated pattern recognition software until the crab is in the "field of view" 214. The "field of view" 214 is defined by the area delineated by lines 216 in FIG. 2B that corresponds to the focussed viewing section of camera 210 on the upper surface 217 of conveyor belt 201b, and that is also optionally located directly above the area of conveyor belt 201b that is illuminated (when a translucent conveyor belt is used) by light source 215 as shown by arrows 222. The "field of view" 214 is also shown as that area delineated by lines 303A and 303B in FIG. 3. In operation, when the "field of view" 214 is illuminated by light source 215 located below a lower surface 213 of a translucent conveyor belt 201b, this is to generally ensure that the crab's body is sufficiently contrasted from the upper surface 217 of the conveyor belt 201b itself for effective image collection by camera 210, thereby providing a highly defined silhouette image that can be effectively processed into image data by the processor associated with camera 210 and analyzed by the pattern recognition software (as will be described below). In general, the use of a silhouette image, as described above, is sufficient for use if it is desirable to simply determine the presence, location, orientation, and size of the crab on conveyor belt 201b, and not preferable or desirable for the camera 210 and associated pattern recognition software to also attempt to be able to determine the locations on the crab body to be cut by the sensor-guided cutting apparatus 207 at this early stage. In such a situation, a second sensor camera with associated pattern recognition software can be used with the SGB system later in the process once the crab is placed on saddle 501 to determine the locations on the crab to be cut. Otherwise, if it is desirable to determine the locations on the crab body to be cut by the sensor-guided cutting apparatus 207 at an early stage by camera 210 and associated pattern recognition software, the SGP system does not require a conveyor belt 201b that is translucent or a light source 215, but instead must employ a sufficiently high resolution camera 210 and the system as a whole must be made to be extremely accurate in terms of the quality of scanned images and the processing thereof, and in the exacting placement of the crab in the holding system 204 in order for quality crab portions to be produced.

For a proper understanding of how the (x,y) coordinate system is used by the pattern recognition software, it is important to note that (x,y) coordinates are established with reference to mid-line 305 and centre-line 304. Mid-line 305 is the simulated line that effectively cuts the "field of view" 214 in half along the y-axis or width of the "field of view" 214 on conveyor belt 201b and is represented by the coordinates (0,y), while centre-line 304 is the simulated line that effectively cuts the "field of view" 214 in half along the x-axis or length of the "field of view" 214 on conveyor belt 201b and is represented by the coordinates (x,0). The exact centre-point 306 of the "field of view" 214 is therefore characterized as the point where mid-line 305 intersects with centre-line 304 and is represented as the coordinate (0,0). A key reference point for the operation of the pattern recognition software occurs when it is determined that the centre-point of the centre body portion of the crab has reached the mid-line 305 of the "field of view" 214 on conveyor belt 201b. It is at this point that the processor calculates the effective location, orientation, and size of the crab (and optionally the locations on the crab to be cut depending on whether a second sensor camera is used in the system, as noted above) on the conveyor belt 201b based on the information provided by the pattern recognition software, which information is subsequently relayed to the sensor-guided movement apparatus 211.

As to location of the crab on conveyor belt 201b, when the centre-point of the centre body portion of the crab has reached the mid-line 305 of the "field of view" 214 on conveyor belt 201b (i.e. when x=0), the processor associated with sensor camera 210 notes the y-coordinate, which designates where the centre-point (centroid) of the centre body portion of the crab lies on the conveyor belt 201b in relation to the centre-line 304 thereof (i.e. how off-set the crab is from the centre of the conveyor belt 201b, wherein a +y coordinate means that the crab is located a certain "y" distance to the right of centre-line 304 as it makes its way along the belt (as in crab 320), while a −y coordinate means that the crab is located a certain "y" distance to the left of centre-line 304 as it makes its way along the belt (as in crab 325)). In this respect, as the crab continues to travel along the conveyor belt 201b towards the sensor-guided movement apparatus 211, the y-coordinate will obviously not change, but the x-coordinate must be continually updated to ensure that when the vacuum gripper 212 of sensor-guided movement apparatus 211 is to couple with/grip the crab at the appropriate time at the x-coordinate location of the crab along the conveyor belt 201b, such gripping occurs at the centre-point of the belly 108 of the crab for subsequent proper placement in the holding system 204.

Figure 4A:
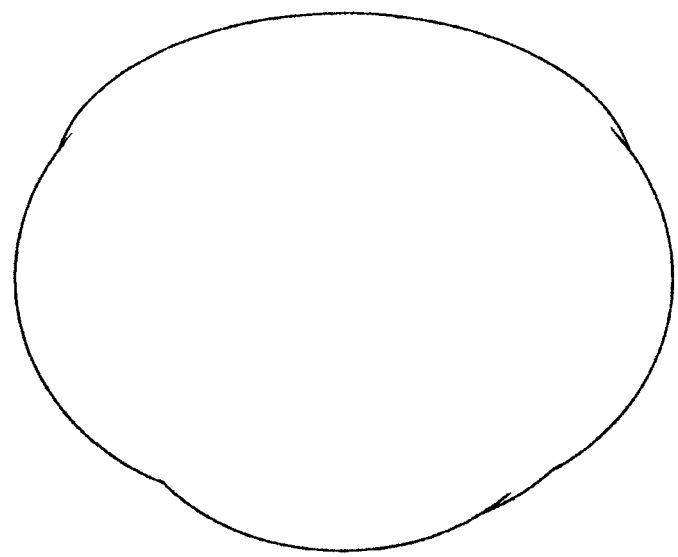
FIG. 4A is a simplified top view of a reference model used by recognition software.
Figure 4B:
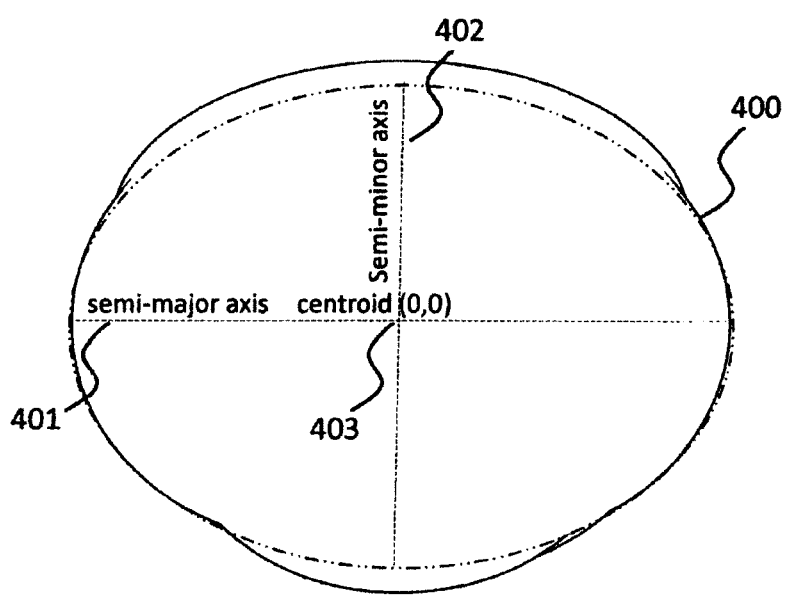
FIG. 4B is a simplified diagram of a top view of an ellipse overlaid on top of a reference model.

As to orientation of the crab on conveyor belt 201b, when the centre-point of the centre body portion of the crab has reached the mid-line 305 of the "field of view" 214 on conveyor belt 201b (i.e. when x=0), the processor must also undertake a best-fit analysis that compares a simulated reference model of the species of crab being processed, such as a Snow Crab, to the images that have been sent from the pattern recognition software to the processor. In this respect, by placing the reference model of the species of crab being processed over the crab image obtained at mid-line 305, the crab's orientation on the conveyor belt 201b may be discerned by rotating the reference model around the centre-point of the centre body portion of the crab image. A useful example for explaining this concept is provided with reference to FIGS. 4A and 4B. FIG. 4A represents a basic reference model for the average outline silhouette of the centre body portion of a belly 108 of a Snow Crab that would be encountered. FIG. 4B is a simplified diagram of a top view of an ellipse 400 overlaid on top of the reference model shown in FIG. 4A. It is apparent that a rotation of the ellipse about centroid point 403 will provide a best-fit at the orientation shown. The same concept applies when overlaying the reference model of the species of crab being processed over the crab image obtained at mid-line 305. Once a best-fit of reference model over crab image has been obtained, the processor can obtain peripheral coordinates of various locations on the edges of the centre body portion of the crab that will assist in determining the size of the crab (discussed below) as well as how much the crab must be rotated by the sensor-guided movement apparatus 211 for accurate placement of the crab at the appropriate time in holding system 204. As for any necessary rotation, the processor will calculate a coordinate translation of the crab from its current orientation (i.e. the various (x,y) peripheral coordinates at various locations on the edges of the centre body portion of the crab) to corresponding translated (x, y) coordinates that will allow the crab to be accurately rotated by the sensor-guided movement apparatus 211 to ensure proper alignment of the crab into saddle 501 of the holding system 204 at the appropriate time (i.e. so that the orientation of the rotated crab matches the required orientation for a proper mating with saddle 501). It should be noted that if a sufficiently high definition camera 210 is used in the SGP system 203 (optionally with backlighting) that detailed patterns on the crab can be analyzed and used to determine very accurate centroid and orientation information.

Figure 12:
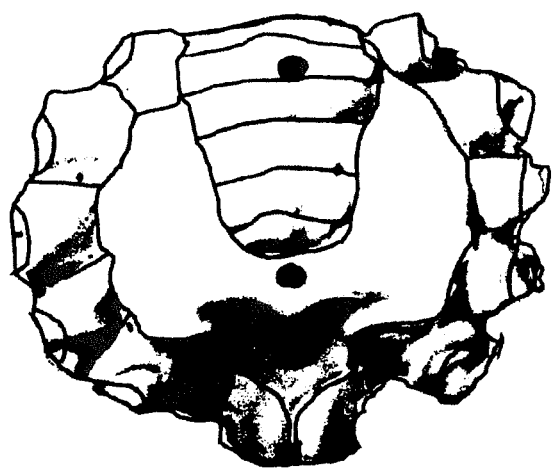
FIG. 12 is an overhead view of a scanned image of the belly of a crab without appendages overlaid with the distinct patterns thereof that are suitable for detection via pattern recognition software.
Figure 13:
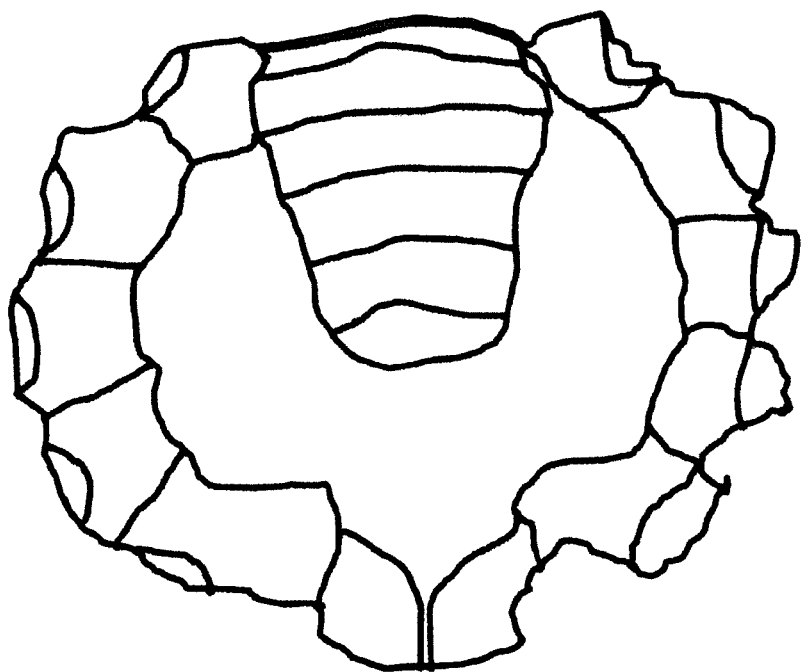
FIG. 13 is an overhead view of the distinct patterns of the crab belly of FIG. 12 that are suitable for detection via pattern recognition software.
Figure 14:
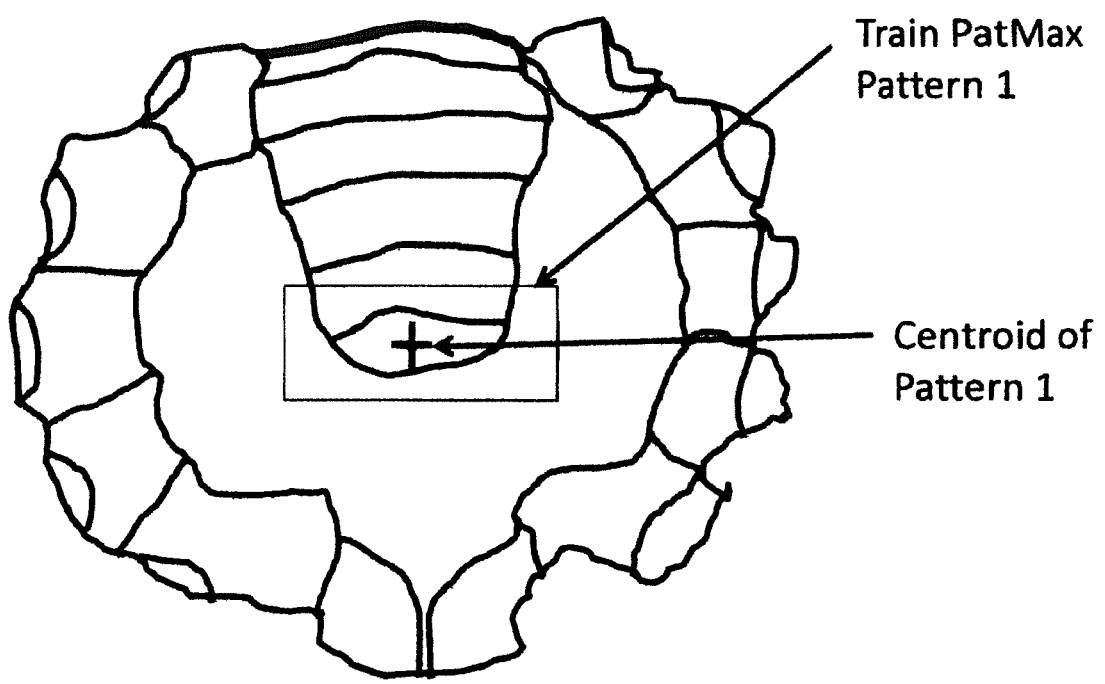
FIG. 14 is an overhead view of the distinct patterns of the crab belly of FIG. 13 that are suitable for detection via pattern recognition software with a bounding box used to train the software to locate the centroid of the crab.

In a preferred embodiment, when using PatMax™ pattern recognition software, to locate the centroid and orientation of a crab, a crab with no appendages is firstly scanned and stored in memory (see FIG. 12). In this respect, the underside or belly of the crab has a number of consistent patterns suitable for detection using image processing (see FIG. 13). The resulting image is then used to "train" a pattern of the crab body using a proprietary tool called "TrainPatMaxPatterns", such that PatMax™ will learn to be able to automatically locate the centroid and orientation of the crab body in the trained image. To find the centroid, a TrainPatMax-Patterns tool bounding box is placed around a distinct feature near the centre of the crab (see Pattern 1 in FIG. 14). The resulting image is then used to train a pattern of that distinct feature. In subsequent scans a proprietary tool called "FindPatMaxPatterns" is used to automatically find the centroid and orientation of the body (based on Pattern 1) of any crab with appendages attached that appears in the "field of view" 214 on conveyor belt 201b.

As to the size of the crab on conveyor belt 201b, when the centre-point of the centre body portion of the crab has reached the mid-line 305 of the "field of view" 214 on conveyor belt 201b (i.e. when x=0), the processor must also calculate the effective 3-dimensional size of the centre body portion of the crab, which information is needed to determine the thickness of the crab (represented by coordinate z as the distance the centre-point on the surface of belly 108 of the crab is from the upper surface 217 on conveyor belt 201b; z=0 represents the surface on conveyor belt 201b). However, because the crab images are only provided in 2-dimensions, the processor must estimate the value of z, an example of which follows. Firstly, the processor may use various (x,y) peripheral coordinates from various locations on the outer edges of the centre body portion of the crab (as determined above) to approximate the length and width of the centre body portion of the crab. For illustration purposes, the length, L, of the centre body portion of the crab corresponds to the semi-major axis line 401, while the width, W, of the centre body portion of the crab corresponds to the semi-minor axis line 402, as shown in FIG. 4B. It has been found that the thickness of any particular crab species can be reliably approximated by mathematical relationship to the length and/or width of the crab. In the case of Snow Crab, after much sampling and mathematical delineation, the inventors have determined that the following equation for determining coordinate z (the thickness of the crab) is acceptable:

$$Z = 0.58W + 2.5$$

In a preferred embodiment, when using PatMax™, the crab scale or width (W) is automatically generated by the FindPatMaxPatterns tool such that the thickness of a crab (z) can be readily determined using the mathematical relationship. Similar mathematical relationships between thickness of a crab (z) and its length (L) and/or width (W) can similarly be determined by persons skilled in the art for other crab species by simple sampling and mathematical delineation.

It is ultimately the (x, y, z) 3-dimensional coordinates (only the x-coordinate must be continually updated as the crab moves along conveyor belt 201b, as noted above, when the calculations have been completed) and orientation that must be conveyed to allow the vacuum gripper 212 of sensor-guided movement apparatus 211 to carefully couple with/grip the crab at the appropriate time at the centre-point of the centre body portion of the crab at simulated (x,y) coordinate along the conveyor belt 201b at a distance above the conveyor belt (z) (corresponding to the thickness of the crab), thereby ensuring such coupling occurs without undue pressure to ensure there is no damage to the crab meat. Thus, once the (x, y, z) coordinates and orientation have been determined, this information is relayed by the processor to the sensor-guided movement apparatus 211, which then carefully couples with the "belly-up" crab by means of its vacuum gripper 212, then lifts and moves the crab towards the saddle 501 of the holding system 204 (rotating the crab as necessary for alignment purposes, as discussed above), and then places the "belly-up" crab on saddle 501 whereby the contours of carapace 106 of the crab appropriately mate with the contours on the surface 506 of the saddle 501. In a preferred embodiment, the PatMax™ output (i.e. x, y, z and orientation) is passed to the ABB FlexPicker™ robot via a proprietary Windows based software tool provided by ABB, PickMaster, the underlying logic and code of which is hidden from the user. The robot's motion is controlled using a programming language provided by ABB, called RAPID. The robot is thereby programmed using RAPID to access the PickMaster data. A RAPID command "MoveL" is used to move the vacuum gripper 212 to the x, y, z position and orientation of the crab as generated by PickMaster to effect the robot's movement.

Figure 8A:
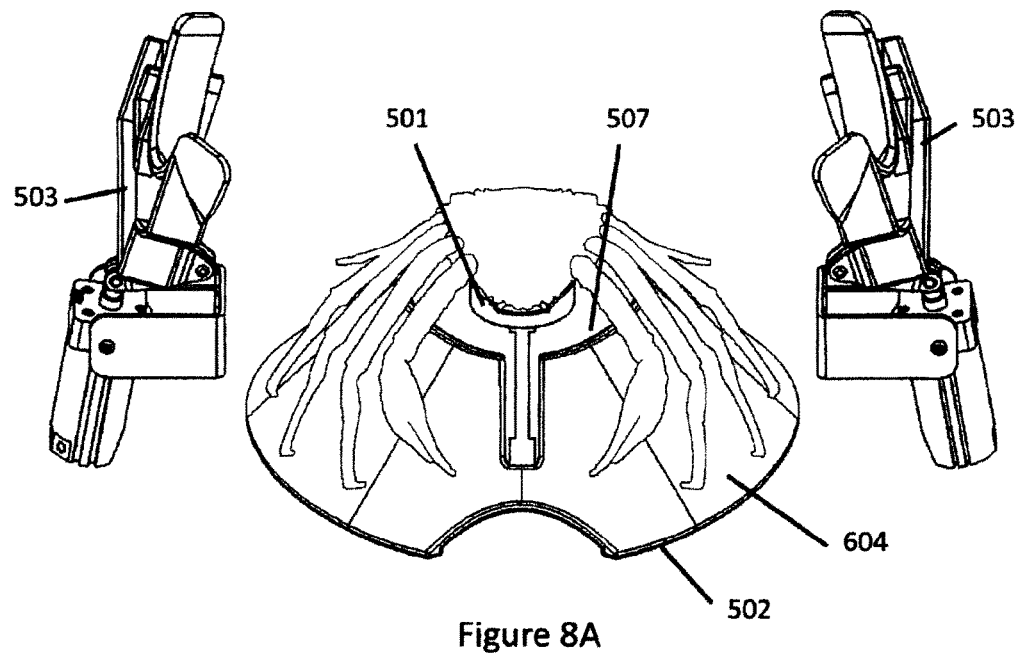
FIG. 8A is a simplified front view of a crab in a saddle and fixture, with the clamps in an "open" position.
Figure 8B:
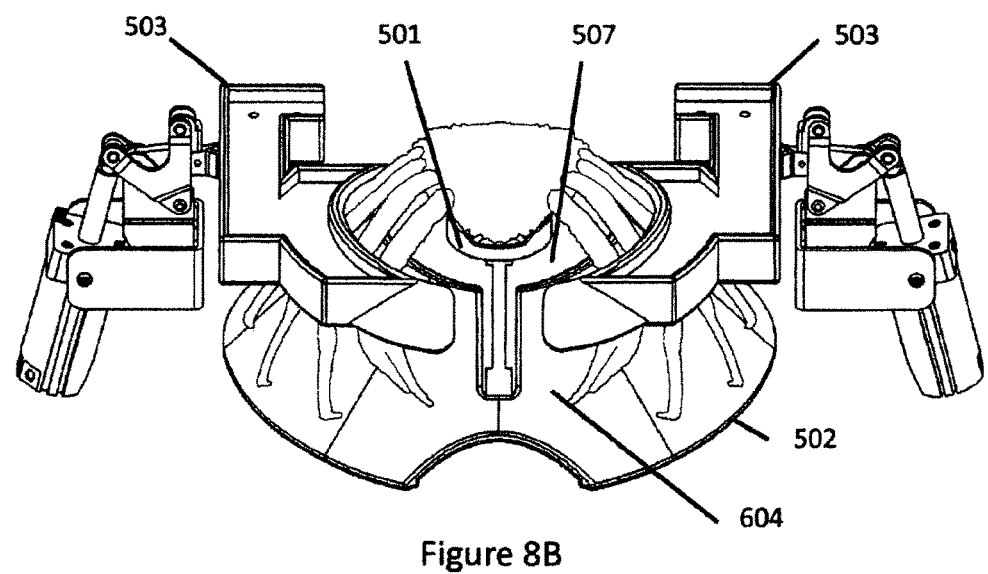
FIG. 8B is a simplified front view of a crab in a saddle and fixture, with the clamps in a "closed" position.
Figure 10A:
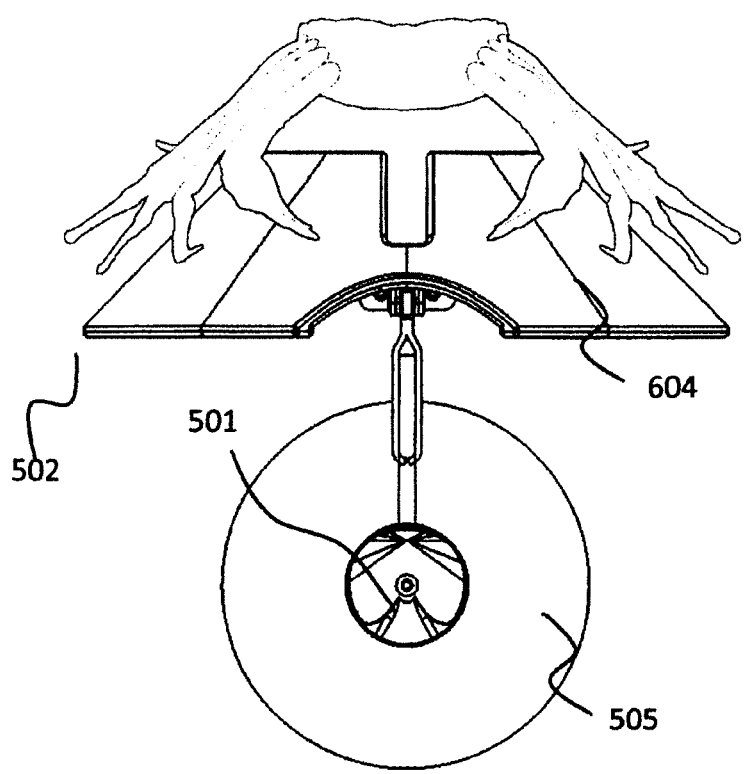
FIG. 10A is a simplified front view of a crab above a fixture, wherein the saddle and saddle support is in a "down" position.
Figure 10B:
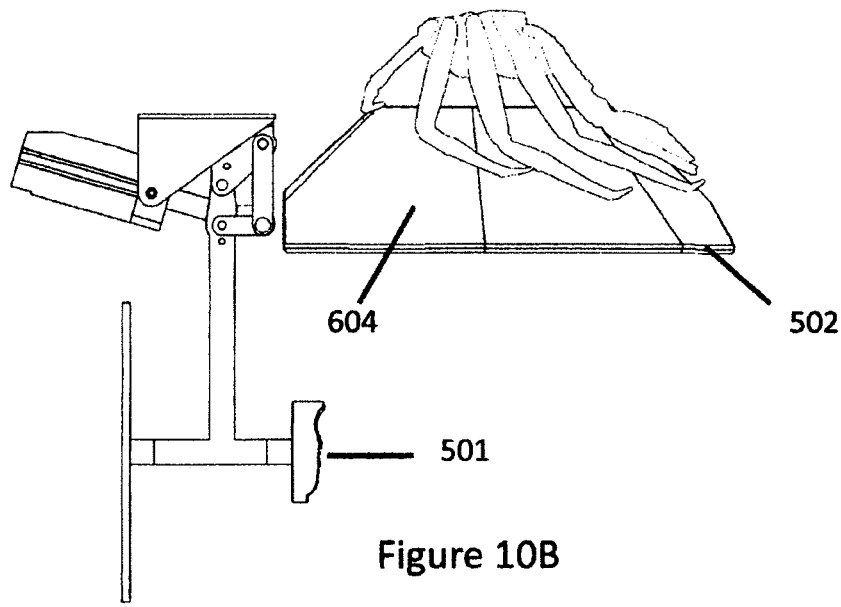
FIG. 10B is a simplified side view of a crab above a fixture, wherein the saddle and saddle support is in a "down" position.
Figure 11:
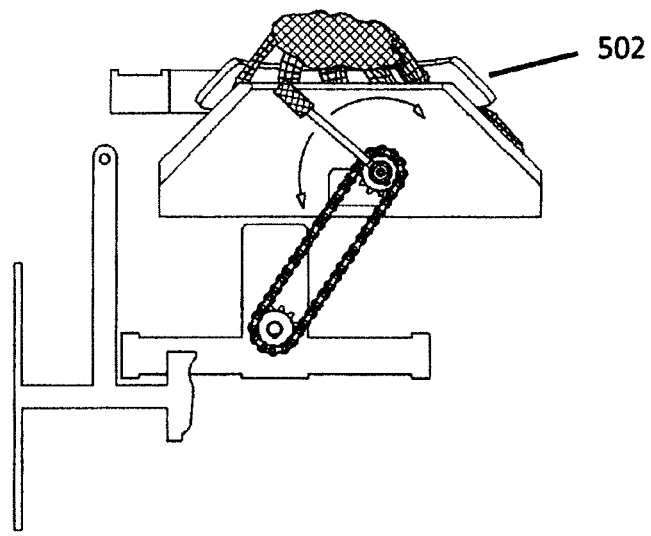
FIG. 11 is a simplified side view of a crab in a saddle, a fixture, and a brush mechanism.

When the crab has firstly been placed in saddle 501 the clamp(s) 503 are in an "open" position, and the crab's appendages drape over the outer surface 604 of fixture 502 as shown in FIG. 8A. As the sensor-guided movement apparatus 211 moves back towards its "home" position to receive the (x, y, z) coordinates and orientation of the next crab to be processed on the conveyor belt 201b, the clamps 503 are moved to a "closed" position, as shown in FIG. 8B, in order to properly hold the crab in place during butchering.

In a preferred embodiment, system 200 comprises an optional user interface configurable by the user that allows the production of a variety of crab products as desired. In one mode of operation, for instance, system 200 may be firstly directed to use the butchering bar 550 to cut right through the belly 108 and carapace 106 of the crab to separate the shoulder meat (see FIG. 9B), followed by employing the cutting apparatus 207 of the SGB system 205 (preferably the rotating cutting blade as mentioned) to slice off the crab's appendages, if desired.

As previously noted, if the processor of the SGP system 203 is configured to be capable of detailing the shape, orientation, size and pattern features of the crab with high accuracy (based on information gathered from sensor camera 210 and associated pattern recognition software), and if the processor of the SGP system 203 is capable of conveying this information to the SGB system 205, and lastly if the sensor-guided movement apparatus 211 is thereafter capable of placing the crab in holding system 204 in an optimal fixed position for subsequent butchering with high accuracy, then the butchering may take place without the need of the otherwise optional second sensor camera and associated pattern recognition software. Otherwise, a second high resolution sensor camera with optional backlight, such as the Cognex In-Sight 5403™ (greyscale, 1600×1200 pixel resolution with 8 bit dynamic range) employing In-Sight Explorer software under the trademark PatMax™ by Cognex Corporation can be used to control the SGB system 205 as desired. In this respect, the second sensor camera and pattern recognition software are used to determine the optimal locations on the crab body for efficient butchering, once the crab is seated in holding system 204. In particular, the various anatomical parts of the crab are identified (e.g. the joints, appendages 104, and centre body portion), and the processor determines the locations on the crab body to be cut to produce optimal products from the crab. The combination of such an automatic sensor system identifying locations for cuts on a crab body, working in cooperation with precise butchering capability of a cutting robot allows for exact and consistent cuts from crab to crab.

In an embodiment that uses a second sensor camera associated with pattern recognition software, as with the first sensor camera it is necessary for the camera to locate and recognize the centroid and accurate orientation of a crab for accurate cutting. An image of a crab with no appendages is therefore firstly scanned and stored in memory of the PatMax™ pattern recognition software in the second sensor camera (as in FIG. 12). Because the underside or belly of the crab has a number of consistent patterns suitable for detection using image processing (see FIG. 13), the resulting image is once again used to "train" a pattern of the crab body using the proprietary tool called "TrainPatMaxPatterns" discussed above, such that PatMax™ will learn to be able to automatically locate the centroid and orientation of the crab body in the trained image. To find the centroid, a TrainPatMaxPatterns tool bounding box is placed around a distinct feature near the centre of the crab (see Pattern 1 in FIG. 14). The resulting image is then used to train a pattern of that distinct feature. In subsequent scans a proprietary tool called "FindPatMaxPatterns" is used to automatically find the centroid and orientation of the body (based on Pattern 1) of any crab with appendages attached that appears on saddle 501.

Figure 15:
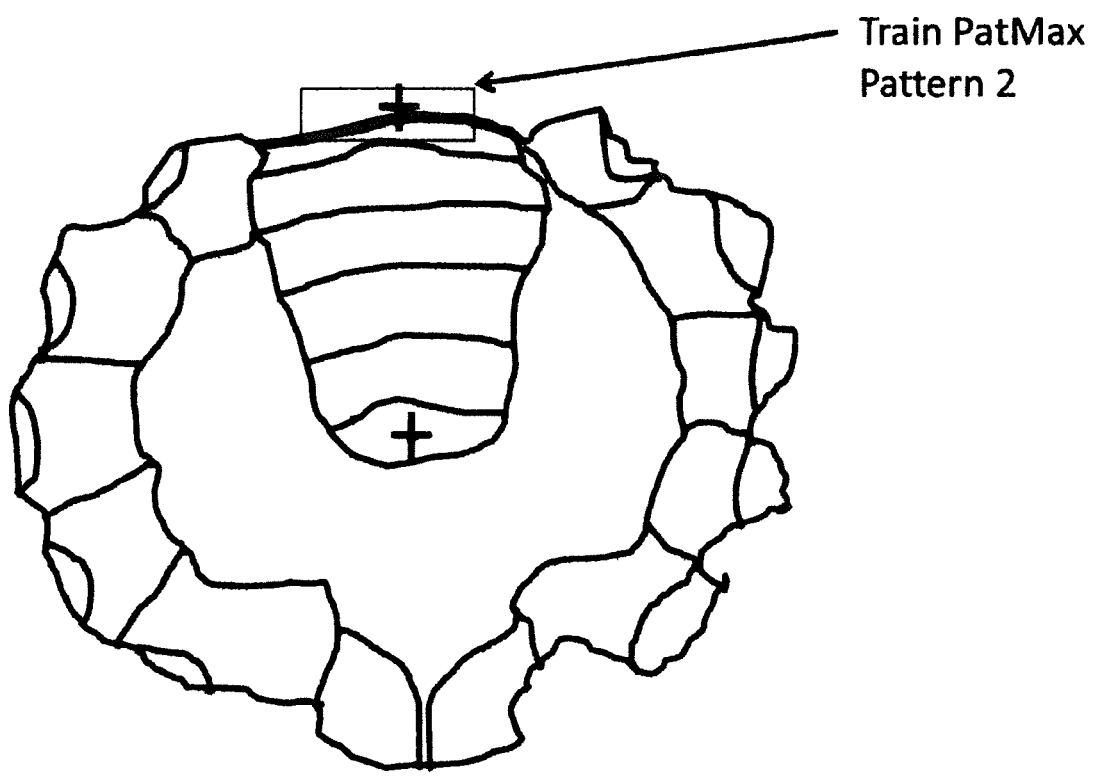
FIG. 15 is an overhead view of the distinct patterns of the crab belly of FIG. 13 that are suitable for detection via pattern recognition software with a bounding box used to train the software to locate a distinctive edge of the crab.
Figure 16:
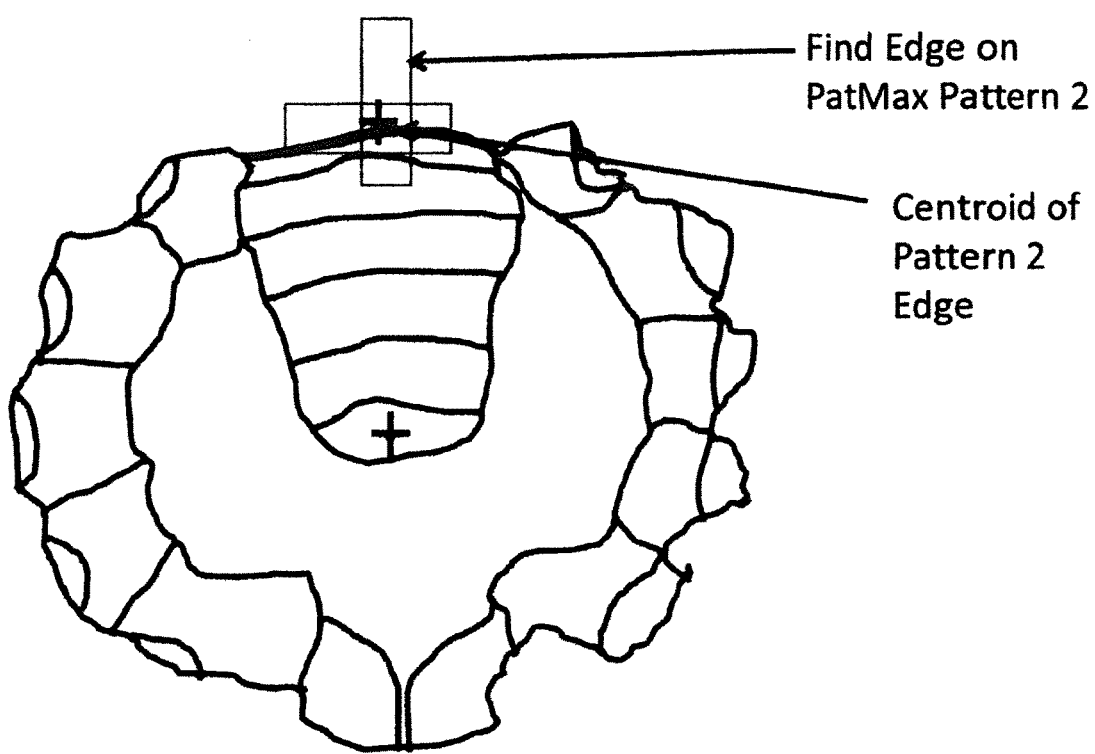
FIG. 16 is an overhead view of the distinct patterns of the crab belly of FIG. 13 that are suitable for detection via pattern recognition software with bounding boxes used to train the software to locate the centroid of the distinctive edge.
Figure 17:
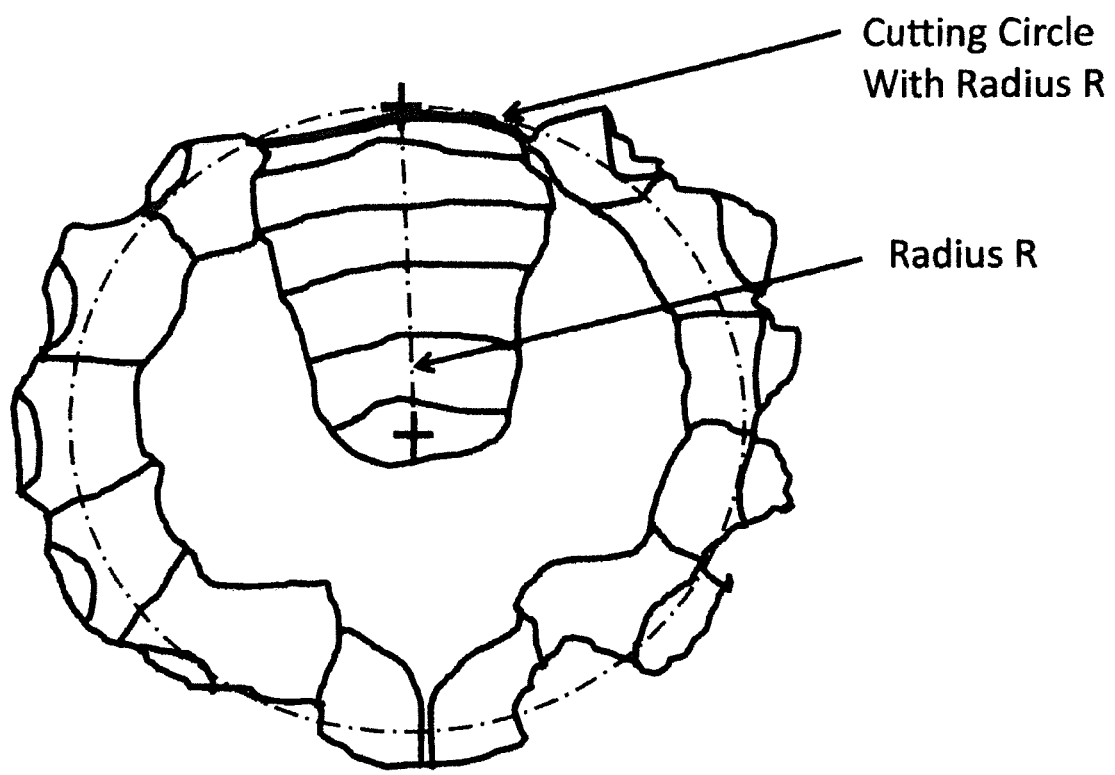
FIG. 17 is an overhead view of the distinct patterns of the crab belly of FIG. 13 that are suitable for detection via pattern recognition software with a cutting circle placed thereon based upon the radius between centroids.
Figure 18:
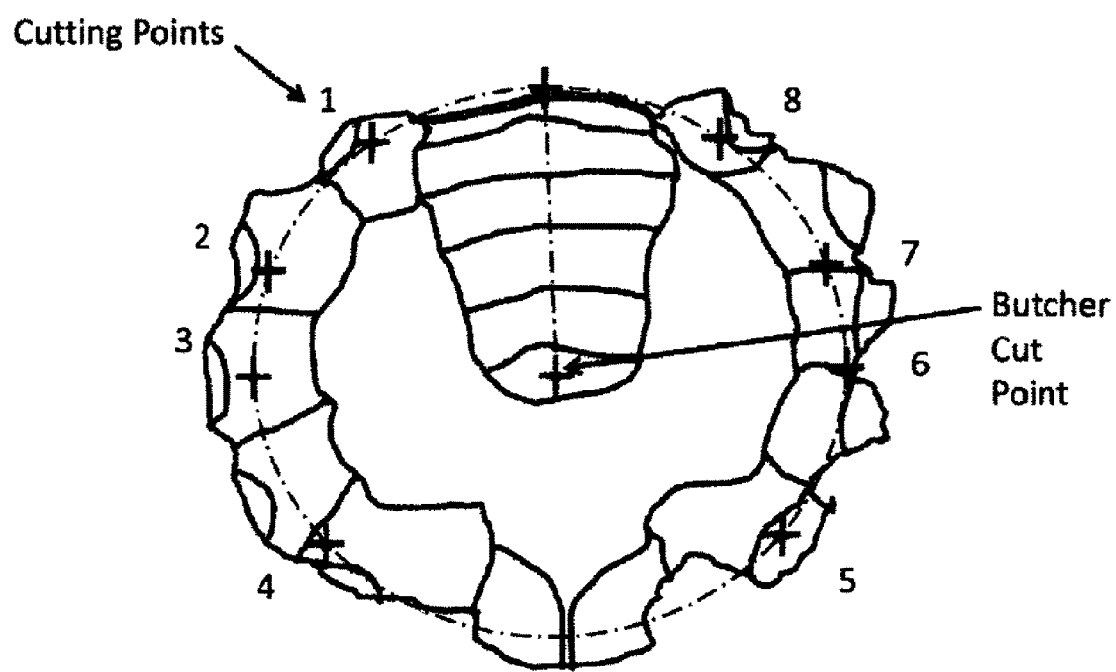
FIG. 18 is an overhead view of the distinct patterns of the crab belly of FIG. 13 that are suitable for detection via pattern recognition software with 8 potential cutting locations placed thereon.

Whether done by the first sensor camera (if the system does not employ a second sensor camera) or by the second sensor camera, accurate cutting requires that the PatMax™ pattern recognition software also detect another distinct feature near the edge of the underside/belly of the crab as shown in FIG. 15. To find the centroid of a distinct feature at the edge of the crab, a TrainPatMaxPatterns tool bounding box is placed around a distinct feature near an uncluttered edge of the crab (see Pattern 2 in FIG. 15). The resulting image is then used to train a pattern for that distinct feature. In subsequent scans a proprietary tool called "FindPatMaxPatterns" is used to automatically find the centroid and orientation of the Pattern 2 of any crab that appears on saddle 501. A proprietary software tool called EDGE is then used to find a discrete transition from the background and the colour of the crab in Pattern 2 (see FIG. 16). A cutting circle is then fit to the two points found in Pattern 2 and the EDGE point in Pattern 1 (see FIG. 17). Using geometry, cutting points are then placed at variable angles offset from the radius (see FIG. 18). These cutting points from 1 to 8 are then passed to the sensor-guided cutting apparatus 207, preferably the ABB IRB robot whose motion is controlled using the proprietary programming language RAPID. A RAPID command "MoveL" is used to move the robot's cutting blade to the position and orientation of those cutting points that will produce the desired crab portions. In this respect, it has been found that cutting apparatus 207 should use a plunging motion with a circular blade in order to cut the crab's appendages, or that a high pressure water jet cutting apparatus be used.

The present sensor-guided automated system is adaptable to butcher various crab species and other crustaceans, such as lobster. Specific and non-limiting examples of various crab species include snow crab, bairdi (or tanner) crab, king crab, as well as cancer crab, such as Dungeness or Jonah.

Although specific embodiments of the invention have been described, it will be apparent to one skilled in the art that variations and modifications to the embodiments may be made within the scope of the following claims.

What is claimed is:

1. A sensor-guided automated system that is capable of intelligently cutting a large-bodied decapod crustacean into a plurality of portions, said system comprising:
an intake apparatus for receiving the crustacean;
a holding system for holding the crustacean in an optimal fixed position when butchering the crustacean;
a sensor-guided positioning system having
a first sensor for sensing the crustacean on the intake apparatus,
pattern recognition software associated with the first sensor for determining the position, orientation and size of the crustacean on the intake apparatus, and
a sensor-guided movement apparatus for moving the crustacean from the intake apparatus to the holding system;
a sensor guided butchering system having
a second sensor for sensing the crustacean in the holding system,
pattern recognition software associated with the second sensor for determining the position, orientation and size of the crustacean in the holding system, and for determining a plurality of locations on the crustacean for cutting the crustacean, the locations dependent on the determined position, orientation and size of the crustacean, and a sensor-guided cutting apparatus for cutting the crustacean at the plurality of locations to create a plurality of crustacean portions; and an outlet apparatus for receiving the plurality of crustacean portions from the holding system after the crustacean has been cut into the plurality of crustacean portions for subsequent packaging.

2. The automated system of claim 1 wherein the intake apparatus comprises a belt conveyor system.

3. The automated system of claim 2 wherein the intake apparatus receives the crustacean belly-up, such that the carapace of the crustacean is laid on the belt conveyor system.

4. The automated system of claim 2 wherein the first sensor comprises a first sensor camera having a field of view over a portion of the belt conveyor system for capturing images of the crustacean.

5. The automated system of claim 4 wherein the pattern recognition software processes the images of the crustacean and generates image data of the crustacean.

6. The automated system of claim 5 wherein processing the images of the crustacean comprises determining the location, orientation and size of the crustacean.

7. The automated system of claim 2 further comprising a light source located under the belt conveyor system for illuminating an area immediately around the crustacean to create a silhouette of the crustacean when the crustacean is in a field of view of the first sensor.

8. The automated system of claim 1 wherein the sensor-guided movement apparatus comprises a robotic arm having a coupling device attached thereto for detachably coupling to the crustacean for moving the crustacean from the intake apparatus to the holding system.

9. The automated system of claim 8 wherein the coupling device is a vacuum gripper.

10. The automated system of claim 1 wherein the holding system comprises:
a saddle having a surface contoured to mate with a centre body portion of the crustacean;
a fixture for supporting appendages of the crustacean; and
one or more clamps for retaining the crustacean in a fixed position by holding the appendages of the crustacean against the fixture.

11. The automated system of claim 10 wherein the surface of the saddle is contoured to mate with a centre body portion of the crustacean on a carapace of the crustacean.

12. The automated system of claim 11 wherein the fixture has a frustoconical-like shape with a top opening and a bottom opening, the top opening situated proximate an underside of the saddle when the saddle is in an "up" position.

13. The automated system of claim 12 wherein the saddle comprises a hinged support for moving the saddle between the "up" position and a "down" position wherein the saddle is located below the bottom opening of the fixture.

14. The automated system of claim 10 further comprising a butcher bar that is capable of driving through the centre body portion of the crustacean while the crustacean is mated with the surface of the saddle for dividing the centre body portion of the crustacean into two pieces and dislodging a carapace from the crustacean body.

15. The automated system of claim 10 wherein the second sensor comprises a second camera for capturing images of the crustacean when the crustacean is mated with the surface of the saddle.

16. The automated system of claim 15 wherein the pattern recognition software associated with the second sensor processes the images of the crustacean and generates image data of the crustacean.

17. The automated system of claim 1 wherein the sensor guided cutting apparatus comprises a robot having a cutting tool.

18. The automated system of claim 17 wherein the cutting tool is a rotating blade having 6 degrees of freedom for cutting the crustacean.

19. A sensor-guided automated system that is capable of intelligently cutting a large-bodied decapod crustacean into a plurality of portions, said system comprising:
an intake apparatus for receiving the crustacean;
a sensor-guided positioning system for:
determining the presence, location, orientation and size of the crustacean on the intake apparatus;
determining locations on the crustacean to be cut based on a desired output of crustacean portions;
coupling with the crustacean; and
placing the crustacean into a holding system for retaining the crustacean in an optimal fixed position for subsequent cutting;
a sensor-guided butchering system for cutting the crustacean at the locations to produce optimal crustacean portions; and
an outlet apparatus for discharging the crustacean portions from the system for subsequent further processing or packaging.

20. The sensor-guided automated system of claim 19 wherein the intake apparatus comprises a belt conveyor system.

21. The sensor-guided automated system of claim 19 wherein the sensor-guided positioning system comprises a sensor camera associated with pattern recognition software for determining the presence, location, orientation and size of the crustacean on the intake apparatus as well as the locations on the crustacean to be cut based on the desired output of crustacean portions, and a sensor-guided movement apparatus for coupling with the crustacean and placing the crustacean into the holding system for retaining the crustacean in the optimal fixed position for subsequent cutting.

22. The sensor-guided automated system of claim 19 wherein the holding system comprises:
a saddle having a surface that is shaped to contour with a general surface of a carapace of the crustacean for stable positioning of the crustacean in the holding system;
a fixture, an upper-most portion of which is positioned below the saddle, that allows appendages of the crustacean to supportively hang away from a centre body portion of the crustacean; and
at least one clamp that is capable of effectively holding the crustacean in place with sufficient pressure during cutting without damaging the appendages.

23. The sensor-guided automated system of claim 22 wherein the fixture is frustoconically shaped, resembling an inverted cone, having its upper-most portion cut off providing an opening around a periphery of the saddle.

24. The sensor-guided automated system of claim 23 wherein the fixture is not coupled to the saddle to allow for the free movement of the saddle in relation thereto.

25. The sensor-guided automated system of claim 22 wherein the at least one clamp has a portion that engages the appendages of the crustacean and that is shaped to correspond to an outer surface of the fixture.

26. The sensor-guided automated system of claim 19 wherein the sensor-guided butchering system comprises a sensor-guided cutting apparatus for cutting the crustacean at the locations to produce the optimal crustacean portions, and a butchering bar that is capable of effectively splitting a centre body portion of the crustacean in two pieces.

27. The sensor-guided automated system of claim 19 wherein the outlet apparatus comprises a belt conveyor system.

\* \* \* \* \*